(12) United States Patent
Nguyen et al.

(10) Patent No.: US 12,491,290 B2
(45) Date of Patent: Dec. 9, 2025

(54) BIODEGRADABLE PIEZOELECTRIC COMPOSITE MATERIALS

(71) Applicant: University of Connecticut, Farmington, CT (US)

(72) Inventors: Thanh Duc Nguyen, South Windsor, CT (US); Yang Liu, Farmington, CT (US)

(73) Assignee: University of Connecticut, Farmington, CT (US)

( * ) Notice: Subject to any disclaimer, the term of this patent is extended or adjusted under 35 U.S.C. 154(b) by 1188 days.

(21) Appl. No.: 17/371,715

(22) Filed: Jul. 9, 2021

(65) Prior Publication Data

US 2021/0379249 A1    Dec. 9, 2021

Related U.S. Application Data

(63) Continuation-in-part of application No. 17/342,470, filed on Jun. 8, 2021, now abandoned.

(60) Provisional application No. 63/050,478, filed on Jul. 10, 2020, provisional application No. 63/035,891, filed on Jun. 8, 2020.

(51) Int. Cl.
| | |
|---|---|
| *A61L 27/44* | (2006.01) |
| *A61L 27/56* | (2006.01) |
| *A61L 27/58* | (2006.01) |
| *A61N 7/00* | (2006.01) |
| *D01D 5/00* | (2006.01) |
| *D03D 1/00* | (2006.01) |
| *B82Y 5/00* | (2011.01) |
| *B82Y 30/00* | (2011.01) |
| *B82Y 40/00* | (2011.01) |

(52) U.S. Cl.
CPC ............ *A61L 27/446* (2013.01); *A61L 27/56* (2013.01); *A61L 27/58* (2013.01); *A61N 7/00* (2013.01); *D01D 5/0007* (2013.01); *D03D 1/0088* (2013.01); *A61L 2400/12* (2013.01); *A61N 2007/0004* (2013.01); *B82Y 5/00* (2013.01); *B82Y 30/00* (2013.01); *B82Y 40/00* (2013.01); *D10B 2331/041* (2013.01); *D10B 2401/12* (2013.01); *D10B 2401/16* (2013.01); *D10B 2509/00* (2013.01)

(58) Field of Classification Search
CPC ......... A61L 27/446; A61L 27/56; A61L 27/58
See application file for complete search history.

(56) References Cited

U.S. PATENT DOCUMENTS

| | | |
|---|---|---|
| 4,198,987 A | 4/1980 | Cain et al. |
| 4,438,773 A | 3/1984 | Letterio |
| 5,131,276 A | 7/1992 | Kibblewhite |
| 5,246,013 A | 9/1993 | Frank et al. |
| 5,287,331 A | 2/1994 | Schindel et al. |
| 5,306,620 A | 4/1994 | Ginsberg et al. |
| 5,443,495 A | 8/1995 | Buscemi et al. |
| 5,498,499 A | 3/1996 | Flow et al. |
| 5,512,600 A | 4/1996 | Mikos et al. |
| 5,514,378 A | 5/1996 | Mikos et al. |
| 5,678,565 A | 10/1997 | Sarvazyan |
| 5,684,061 A * | 11/1997 | Ohnishi ............. A61L 31/14 523/105 |
| 5,697,901 A | 12/1997 | Eriksson |
| 5,794,023 A | 8/1998 | Hobbs et al. |
| 5,827,198 A | 10/1998 | Kassal |
| 5,891,191 A | 4/1999 | Stinson |
| 5,967,989 A | 10/1999 | Cimochowski et al. |
| 6,142,948 A | 11/2000 | Toda |
| 6,219,574 B1 | 4/2001 | Cormier et al. |
| 6,334,856 B1 | 1/2002 | Allen et al. |
| 6,447,887 B1 | 9/2002 | Claus et al. |
| 6,468,219 B1 | 10/2002 | Njemanze |
| 6,627,421 B1 | 9/2003 | Unger et al. |
| 6,835,377 B2 | 12/2004 | Goldberg et al. |
| 7,001,372 B2 | 2/2006 | Richter |
| 7,184,826 B2 | 2/2007 | Cormier et al. |
| 7,332,197 B2 | 2/2008 | Wood et al. |
| 7,344,499 B1 | 3/2008 | Prausnitz et al. |
| 7,396,537 B1 | 7/2008 | Krupnick et al. |
| 7,879,093 B2 | 2/2011 | Wei et al. |

(Continued)

FOREIGN PATENT DOCUMENTS

| | | |
|---|---|---|
| CN | 102657914 B | 5/2015 |
| CN | 106109792 A | 11/2016 |

(Continued)

OTHER PUBLICATIONS

Suryavanshi, A. et al "Magnesium oxide nanoparticle-loaded polycaprolactone composite electrospun fiber scaffolds for bone-soft tissue engineering applications: in-vitro and in-vivo evaluation" Biomed. Mater. 12 (2017) 055011, pp. 1-13 (Year: 2017).*

(Continued)

*Primary Examiner* — Andrew S Rosenthal
(74) *Attorney, Agent, or Firm* — Michael Best & Friedrich LLP

(57) ABSTRACT

A biodegradable and biocompatible barrier membrane of piezoelectric nano composites of Metallic Oxide (MO) (e.g., Magnesium oxide, Zinc oxide and iron oxide)-PLLA (Poly-L-lactide), which can be subjected to acoustic pressure from ultrasound, to generate useful electrical charge for enhanced bone regeneration and enhanced antibacterial effects for guided bone regeneration to treat dental diseases, such as periodontitis.

17 Claims, 13 Drawing Sheets

(12 of 13 Drawing Sheet(s) Filed in Color)

(56) References Cited

U.S. PATENT DOCUMENTS

| | | |
|---|---|---|
| 7,906,223 B2 | 3/2011 | Rakow et al. |
| 8,067,110 B2 | 11/2011 | Rakow et al. |
| 8,162,901 B2 | 4/2012 | Gonnelli et al. |
| D659,820 S | 5/2012 | Abel et al. |
| 8,301,262 B2 | 10/2012 | Mi et al. |
| 8,469,936 B2 | 6/2013 | Robinson et al. |
| 8,708,966 B2 | 4/2014 | Allen et al. |
| 8,798,932 B2 | 8/2014 | Boyden et al. |
| 8,946,974 B2 | 2/2015 | Yu et al. |
| 8,955,515 B2 | 2/2015 | Rakow et al. |
| 9,040,087 B2 | 5/2015 | Boyden et al. |
| 9,050,053 B2 | 6/2015 | Morgan |
| 9,089,677 B2 | 7/2015 | Soo et al. |
| 9,192,655 B2 | 11/2015 | Arinzeh et al. |
| 9,381,680 B2 | 7/2016 | Oh et al. |
| 9,444,030 B2 | 9/2016 | Wang et al. |
| 9,527,257 B2 | 12/2016 | Lipton et al. |
| 9,795,774 B2 | 10/2017 | Takada et al. |
| 9,846,091 B2 | 12/2017 | Lu et al. |
| 9,849,270 B2 | 12/2017 | Stockholm |
| 9,949,035 B2 | 4/2018 | Rucker et al. |
| 10,004,790 B2 | 6/2018 | D'Souza |
| 10,098,574 B1 | 10/2018 | Kam |
| 10,245,421 B2 | 4/2019 | Ross |
| 10,292,831 B2 | 5/2019 | Zellmer et al. |
| 10,500,300 B2 | 12/2019 | Dybe et al. |
| 10,617,880 B2 | 4/2020 | Zellmer et al. |
| 10,632,653 B2 | 4/2020 | Niitsu et al. |
| 10,710,011 B2 | 7/2020 | Inoue et al. |
| 2002/0081732 A1 | 6/2002 | Bowlin et al. |
| 2002/0082543 A1 | 6/2002 | Park et al. |
| 2004/0015211 A1 | 1/2004 | Nurmikko et al. |
| 2004/0018226 A1 | 1/2004 | Wnek et al. |
| 2004/0028655 A1 | 2/2004 | Nelson et al. |
| 2005/0248547 A1 | 11/2005 | Kent et al. |
| 2006/0043843 A1 | 3/2006 | Sugiura et al. |
| 2006/0050189 A1 | 3/2006 | Ito et al. |
| 2006/0107749 A1 | 5/2006 | Liu et al. |
| 2006/0190080 A1 | 8/2006 | Danoff et al. |
| 2006/0224237 A1 | 10/2006 | Furst et al. |
| 2007/0141106 A1 | 6/2007 | Bonutti et al. |
| 2007/0225631 A1 | 9/2007 | Bowlin et al. |
| 2007/0255422 A1 | 11/2007 | Wei et al. |
| 2007/0270738 A1 | 11/2007 | Wu et al. |
| 2007/0293912 A1 | 12/2007 | Cowan et al. |
| 2008/0009802 A1 | 1/2008 | Lambino et al. |
| 2008/0058633 A1 | 3/2008 | Boyden et al. |
| 2008/0269666 A1 | 10/2008 | Wang et al. |
| 2009/0030365 A1 | 1/2009 | Tokumoto et al. |
| 2009/0062723 A1 | 3/2009 | Skiba |
| 2009/0163965 A1 | 6/2009 | Boyden et al. |
| 2009/0182306 A1 | 7/2009 | Lee et al. |
| 2009/0192431 A1 | 7/2009 | Horstmann et al. |
| 2009/0280153 A1 | 11/2009 | Hunter et al. |
| 2010/0152644 A1 | 6/2010 | Pesach et al. |
| 2011/0028905 A1 | 2/2011 | Takada |
| 2011/0109204 A1 | 5/2011 | Tajitsu et al. |
| 2011/0230747 A1 | 9/2011 | Rogers et al. |
| 2011/0242310 A1 | 10/2011 | Beebe et al. |
| 2012/0197155 A1 | 8/2012 | Mattes et al. |
| 2012/0226295 A1 | 9/2012 | Jabbari |
| 2013/0005708 A1 | 1/2013 | Lalwani |
| 2013/0041244 A1 | 2/2013 | Woias et al. |
| 2013/0086703 A1 | 4/2013 | Maruyama et al. |
| 2013/0140649 A1 | 6/2013 | Rogers et al. |
| 2014/0005606 A1 | 1/2014 | Chen et al. |
| 2014/0145365 A1 | 5/2014 | Omenetto et al. |
| 2014/0333184 A1 | 11/2014 | Wang et al. |
| 2015/0073551 A1 | 3/2015 | Uehlin |
| 2015/0134061 A1 | 5/2015 | Friis et al. |
| 2015/0165020 A1 | 6/2015 | Jaklenec et al. |
| 2015/0236242 A1 | 8/2015 | Ryu et al. |
| 2016/0005951 A1 | 1/2016 | Yoshida et al. |
| 2016/0050750 A1 | 2/2016 | Rogers et al. |
| 2016/0067375 A1 | 3/2016 | Holmes et al. |
| 2016/0095599 A1 | 4/2016 | Jose et al. |
| 2016/0175408 A1 | 6/2016 | Chang et al. |
| 2016/0184571 A1 | 6/2016 | Admati |
| 2016/0184595 A1 | 6/2016 | Hossainy |
| 2016/0190427 A1 | 6/2016 | Kim et al. |
| 2016/0287668 A1 | 10/2016 | Tankovich |
| 2017/0020402 A1 | 1/2017 | Rogers et al. |
| 2017/0027168 A1 | 2/2017 | Heath |
| 2017/0080196 A1 | 3/2017 | Lee et al. |
| 2017/0179370 A1 | 6/2017 | Kim et al. |
| 2017/0189660 A1 | 7/2017 | Baek |
| 2017/0252546 A1 | 9/2017 | Park et al. |
| 2017/0258738 A1 | 9/2017 | DeMuth et al. |
| 2017/0268942 A1 | 9/2017 | Pedder et al. |
| 2017/0306295 A1 | 10/2017 | Hazot et al. |
| 2017/0368321 A1 | 12/2017 | Baek |
| 2018/0055643 A1 | 3/2018 | Castro et al. |
| 2018/0140817 A1 | 5/2018 | Spector |
| 2018/0256905 A1 | 9/2018 | Francia et al. |
| 2018/0289616 A1 | 10/2018 | Chen et al. |
| 2018/0325806 A1 | 11/2018 | Litvack et al. |
| 2019/0003905 A1* | 1/2019 | Yoshida ............... H10N 30/857 |
| 2019/0142318 A1 | 5/2019 | Diebold et al. |
| 2019/0209819 A1 | 7/2019 | Ross |
| 2019/0217071 A1 | 7/2019 | Engel et al. |
| 2019/0269895 A1 | 9/2019 | Nguyen et al. |
| 2019/0307697 A1 | 10/2019 | Ma et al. |
| 2019/0319181 A1 | 10/2019 | Melandso et al. |
| 2019/0328285 A1 | 10/2019 | Liu |
| 2019/0330771 A1 | 10/2019 | Takumi et al. |
| 2020/0009767 A1 | 1/2020 | Li |
| 2020/0093966 A1 | 3/2020 | Rabolt et al. |
| 2020/0276018 A1 | 9/2020 | Nguyen et al. |
| 2020/0276365 A1 | 9/2020 | Nguyen et al. |
| 2020/0282350 A1 | 9/2020 | Inoue et al. |
| 2020/0292206 A1 | 9/2020 | Tamakura et al. |
| 2020/0313066 A1 | 10/2020 | Getman |
| 2021/0127998 A1 | 5/2021 | Nguyen et al. |
| 2021/0283387 A1 | 9/2021 | Silbart et al. |
| 2021/0378949 A1 | 12/2021 | Nguyen et al. |
| 2022/0096371 A1 | 3/2022 | Nguyen et al. |
| 2022/0176171 A1 | 6/2022 | Nguyen et al. |

FOREIGN PATENT DOCUMENTS

| | | |
|---|---|---|
| EP | 0955359 B1 | 1/2009 |
| EP | 1993621 B1 | 8/2011 |
| EP | 1715915 B1 | 11/2012 |
| EP | 2482772 B1 | 10/2018 |
| EP | 2786644 B1 | 4/2019 |
| EP | 3542740 A1 | 9/2019 |
| IN | 202041031484 A | 7/2020 |
| KR | 101832716 B1 | 2/2018 |
| RU | 2082467 C1 | 6/1997 |
| WO | WO 2006057987 A1 | 6/2006 |
| WO | WO 2008085904 A1 | 7/2008 |
| WO | WO 2011115643 A1 | 9/2011 |
| WO | WO 2012103257 A2 | 8/2012 |
| WO | WO 2012127224 A1 | 9/2012 |
| WO | WO 2013101908 A1 | 7/2013 |
| WO | WO 2014143412 A8 | 11/2014 |
| WO | WO 2017003238 A1 | 1/2017 |
| WO | WO 2017011320 A1 | 1/2017 |
| WO | WO 2017139253 A1 | 8/2017 |
| WO | WO 2017151715 A1 | 9/2017 |
| WO | 2017191542 A1 | 11/2017 |
| WO | WO 2018017196 A1 | 1/2018 |
| WO | WO 2018089918 A1 | 5/2018 |
| WO | WO 2018114871 A1 | 6/2018 |
| WO | WO 2018170132 A1 | 9/2018 |
| WO | WO 2019025625 A1 | 2/2019 |
| WO | WO 2019094349 A1 | 5/2019 |
| WO | WO 2019143293 A1 | 7/2019 |

OTHER PUBLICATIONS

ABCAM. ELISA kit for MCP-1. https://www.abcam.com/rat-mcp1-elisa-kit-ab219045.html. Accessed Aug. 22, 2022 (5 pages).

(56) References Cited

OTHER PUBLICATIONS

ABCAM. ELISA kit for TNF-alpha. https://www.abcam.com/rat-tnf-alpha-elisa-kit-ab236712.html. Accessed Aug. 22, 2022 (5 pages).
AFPRO Filters. Pm1: The Most Harzardous Kind of Particulate Matter. https://web.archive.org/web/20200609213853/https://www.afprofilters.com/pm1-airfilter/, Jun. 9, 2020, (4 pages).
Ager, D. J. et al. Stability of aspirin in solid mixtures. Journal of pharmaceutical sciences 1986, 75, (1), 97-101.
Alemdaroğlu, C.; et al. An investigation on burn wound healing in rats with chitosan gel formulation containing epidermal growth factor. Burns 2006, 32, (3), 319-327.
Alneami AQ, et al. Effect of Electrical Current Stimulation on Pseudomonas Aeruginosa Growth. Journal of Physics: Conference Series. 2018;1003:012112.
Amini et al., "Bone tissue engineering: recent advances and challenges," Critical Reviews™ in Biomedical Engineering, 2012, 40,(5):363-408.
Amirnasr, E. et al. Basis Weight Uniformity Analysis in Nonwovens. The Journal of The Textile Institute 2014, 105 (4), 444-453.
Ando et al., "Film sensor device fabricated by a piezoelectric poly(L-lactic acid) film", 2012, Jpn J Appl Phys 51:09LD14.
Ando et al., "Pressure-sensitive touch panel based on piezoelectric poly (1-lactic acid) film", 2013, Jpn. J. Appl. Phys. 52:09KD17.
Ando et al., "New human machine interface devices using a piezoelectric poly(L-lactic acid) film" in 2013 IEEE International Symposium on the Applications of Ferroelectric and Workshop on the Piezoresponse Force Microscopy (ISAF/PFM) (IEEE, 2013), pp. 236-239.
Anglen, "The clinical use of bone stimulators," Journal of the Southern Orthopaedic Association, 2002, 12, (2), 46-54.
Arakha M, et al. The effects of interfacial potential on antimicrobial propensity of ZnO nanoparticle. Scientific Reports. 2015;5(1):9578.
Asadi MR, et al. Bacterial Inhibition by Electrical Stimulation. Advances in Wound Care. 2013;3(2):91-97.
Atkins et al. Raman spectroscopy of blood and blood components. Appl. Spectrosc. 71, 767-793 (2017).
Babu, R et al. Assessment of skin irritation and molecular responses in rat skin exposed to nonane, dodecane and tetradecane. Toxicology letters 2004, 153, (2), 255-266.
Bai, Y.; et al. Washable Multilayer Triboelectric Air Filter for Efficient Particulate Matter Pm2. 5 Removal. Advanced Functional Materials 2018, 28 (15), 1706680.
Baker, B., et al. Electrical stimulation of articular cartilage regeneration. Annals of the New York Academy of Sciences 238, 491-499 (1974).
Banerjee J, et al. Silver-zinc redox-coupled electroceutical wound dressing disrupts bacterial biofilm. PLoS One. 2015;10(3):e0119531-e0119531.
Barbour, K. E.; et al., Prevalence of doctor-diagnosed arthritis and arthritis-attributable activity limitation—United States, 2010-2012. MMWR. Morbidity and mortality weekly report 2013, 62, (44), 869-873.
Barbour, K. E.; et al., Vital signs: prevalence of doctor-diagnosed arthritis and arthritis-attributable activity limitation—United States, 2013-2015. MMWR. Morbidity and mortality weekly report 2017, 66, (9), 246-253.
Barki KG, et al. Electric Field Based Dressing Disrupts Mixed-Species Bacterial Biofilm Infection and Restores Functional Wound Healing. Ann Surg. 2019;269(4).
Barton, N. J.; et al., Demonstration of a novel technique to quantitatively assess inflammatory mediators and cells in rat knee joints. Journal of Inflammation 2007, 4, (1), 13.
Bastaki, S. M.; et al. Effect of Aspirin and ibuprofen either alone or in combination on gastric mucosa and bleeding time and on serum prostaglandin E 2 and thromboxane A 2 levels in the anaesthetized rats in vivo. Molecular and cellular biochemistry 2018, 438, (1-2), 25-34.
Bauer et al., "Bone Graft Materials: An Overview of the Basic Science," Clinical orthopaedics and related research, 2000, 371, 10-27.

Baur D, Gladstone BP, Burkert F, Carrara E, Foschi F, Dobele S, Tacconelli E: Effect of antibiotic stewardship on the incidence of infection and colonisation with antibiotic-resistant bacteria and Clostridium difficile infection: a systematic review and meta-analysis. Lancet Infect Dis 2017, 17(9):990-1001.
BCC Research—Global Markets for Drug-Device Combinations, Jan. 2015. PHM045D.
Beaudet J, Tulman ER, Pflaum K, Liao X, Kutish GF, Szczepanek SM, Silbart LK, Geary SJ: Transcriptional Profiling of the Chicken Tracheal Response to Virulent Mycoplasma gallisepticum Strain Rlow. Infect Immun 2017, 85(10).
Bello et al., "Development of a smart pump for monitoring and controlling intraocular pressure", Ann Biomed Eng 45:990-1002, 2017.
Bergsma JE, et al. Late degradation tissue response to poly(1-lactide) bone plates and screws. Biomaterials. 1995;16(1):25-31.
Besinis, A.; et al. Antibacterial activity and biofilm inhibition by surface modified titanium alloy medical implants following application of silver, titanium dioxide and hydroxyapatite nanocoatings. Nanotoxicology 2017, 11, (3), 327-338.
Bir SC, et al. Control of angiogenesis dictated by picomolar superoxide levels. Free Radic Biol Med. 2013;63:135-142.
Blake KM, Carrigan SO, Issekutz AC, Stadnyk AW: Neutrophils migrate across intestinal epithelium using beta2 integrin (CD11b/CD18)-independent mechanisms. Clin Exp Immunol 2004, 136(2):262-268.
Bloomberg News. Mask Mandates by Nation: Most Still Await a Breath of Fresh Air. https://www.bloomberg.com/news/articles/2021-05-14/mask-mandates-by-nation-most-still-await-a-breath-of-fresh-air. May 14, 2021 (9 pages).
Boks NP, et al. Forces involved in bacterial adhesion to hydrophilic and hydrophobic surfaces. Microbiology. 2008;154(Pt 10):3122-3133.
Bos et al., "Resorbable poly(L-lactide) plates and screws for the fixation of zygomatic fractures", 1987, J Oral Maxillofac Surg, 45:751-753.
Bose, S.; et al. A review on advances of sustained release drug delivery system. Int. Res. J. Pharm 2013, 4, 1-4.
Boster Bio. ELISA kit for IL-1 alpha. https://www.bosterbio.com/rat-il-1-alpha-picokine-trade-elisa-kit-ek0390-boster.html#bs_references. Jul. 1, 2013. Accessed on Aug. 22, 2022. (8 pages).
Bottino, M. C et al. in Biomaterials for Oral and Craniomaxillofacial Applications vol. 17 90-100 (Karger Publishers, 2015).
Boutry et al., "A sensitive and Biodegradable Pressure Sensor Array For Cardiovascular Monitoring", Advanced Materials, 27, 2015, pp. 6954-6961.
Boutry et al., A stretchable and biodegradable strain and pressure sensor for orthopaedic application. Nat. Electron. 1, 314-321 (2018).
Boutry et al., Biodegradable and flexible arterial-pulse sensor for the wireless monitoring of blood flow. Nat. Biomed. Eng. 3, 47-57 (2019).
Bronaugh, R. L.; et al., Differences in permeability of rat skin related to sex and body site. J. Soc. Cosmet. Chem 1983, 34, (12), 127-135.
Brooks, J. T.; et al., Effectiveness of Mask Wearing to Control Community Spread of Sars-Cov-2. Jama 2021, 325 (10), 998-999.
Brune, K.; et al. Recent Insight into the Mechanism of Gastrointestinal Tract Ulceration. Scandinavian Journal of Rheumatology 1987, 16, (sup65), 135-140.
Bussemer et al., "Pulsatile drug-delivery systems," Crit Rev Ther Drug Syst., 2001, 18(5):433-458, Abstract.
Byrne, J. D.; et al., Injection Molded Autoclavable, Scalable, Conformable (Imasc) System for Aerosol-Based Protection: A Prospective Single-Arm Feasibility Study. BMJ open 2020, 10 (7), e039120.
Caballe-Serrano, J. et al. On the search of the ideal barrier membrane for guided bone regeneration. Journal of clinical and experimental dentistry 10, e477 (2018).
Cadavid, A. P., Aspirin: the mechanism of action revisited in the context of pregnancy complications. Frontiers in immunology 2017, 8, 261.

(56) References Cited

OTHER PUBLICATIONS

Campbell, C. L. et al. Aspirin dose for the prevention of cardiovascular disease: a systematic review. Jama 2007, 297, (18), 2018-2024.

Carpentier et al., "Clinical trial of blood-brain barrier disruption by pulsed ultrasound," Science translational medicine, 2016, 8(343):343re2, 9 pages.

Carvalho, E. O., et al. "Tailoring bacteria response by piezoelectric stimulation." ACS applied materials & interfaces 11.30 (2019): 27297-27305.

Caspani, M. Delta Variant Pushes US Cases Hospitalizations 6 Month High. Aug. 9, 2021. https://web.archive.org/web/20210809174911/https://www.reuters.com/world/US/delta-variant-pushes-us-cases-hospitalizations-6-month-high-2021-08-09/ (12 pages).

CDC. Antibiotic resistance threats in the United States, 2019. US Department of Health and Human Services. 2019 (150 pages).

CDC. Implementing Filtering Facepiece Respirator (Ffr) Reuse, Including Reuse after Decontamination, When There are Known Shortages of N95 Respirators. https://www.cdc.gov/coronavirus/2019-ncov/hcp/ppe-strategy/decontamination-reuse-respirators.html, Oct. 19, 2020, (10 pages).

CDC. Periodontal Disease. <https://www.cdc.gov/oralhealth/conditions/periodontal-disease.html> (Jul. 10, 2013) (3 pages).

CDC. Personal Protective Equipment: Questions and Answers. https://www.cdc.gov/coronavirus/2019-ncov/hcp/respirator-use-faq.html (Apr. 9, 2021) (6 pages).

Chang et al., Biodegradable electronic systems in 3D, heterogeneously integrated formats. Adv. Mater. 30, 1704955 (2018).

Chatterjee, A.; et al., In vitro and in vivo comparison of dermal irritancy of jet fuel exposure using EpiDerm™ (EPI-200) cultured human skin and hairless rats. Toxicology letters 2006, 167, (2), 85-94.

Chee et al., "An investigation of array of piezoelectric transducer for raindrop energy harvesting application", 2016, IEEE Region Tenth Conference, pp. 3771-3774.

Chen et al., "Fully embeddable chitosan microneedles as a sustained release depot for intradermal vaccination," Biomaterials, 2013, 34(12):3077-3086.

Chen, C.-C.; et al. Aerosol Penetration through Surgical Masks. American journal of infection control 1992, 20(4), 177-184.

Chen, M.-C. et al. Implantable polymeric microneedles with phototriggerable properties as a patient-controlled transdermal analgesia system. Journal of Materials Chemistry B 2017, 5, (3), 496-503.

Cheng, Y.; et al. Face Masks Effectively Limit the Probability of Sars-Cov-2 Transmission. Science 2021 1439-1443.

Chiappini et al., "Biodegradable silicon nanoneedles delivering nucleic acids intracellularly induce localized in vivo neovascularization, " Nature Materials, 2015, 14:532-539.

Choi, S.; et al. Biodegradable, Efficient, and Breathable Multi-Use Face Mask Filter. Advanced Science 2021, 8(6), 2003155.

Chorsi MT, et al. Piezoelectric Biomaterials for Sensors and Actuators. Advanced Materials. 2019;31(1):1802084.

Chu et al., "Piezoelectric stimulation by ultrasound facilitates chondrogenesis of mesenchymal stem cells", J Acoustical Society of American, 2020, vol. 148, No. 1, pp. EL58-EL64.

Chu, D. K.; et al. Physical Distancing, Face Masks, and Eye Protection to Prevent Person-to-Person Transmission of Sars-Cov-2 and Covid-19: A Systematic Review and Meta-Analysis. The lancet 2020, 395 (10242), 1973-1987.

Chu, J.; et al. Thinking Green: Modelling Respirator Reuse Strategies to Reduce Cost and Waste. BMJ open 2021, 11 (7), e048687.

Clearfield, D. S., et al. Osteochondral Differentiation of Fluorescent Multireporter Cells on Zonally-Organized Biomaterials. Tissue Engineering Part A 25, 468-486 (2019).

Cohen et al., "Totally implanted direct current stimulator as treatment for a nonunion in the foot," The Journal of foot and ankle surgery: official publication of the American College of Foot and Ankle Surgeons, 1993, 32, (4), 375-381.

Cohen, A. J.; et al. Estimates and 25-Year Trends of the Global Burden of Disease Attributable to Ambient Air Pollution: An Analysis of Data from the Global Burden of Diseases Study 2015. The Lancet 2017, 389 (10082), 1907-1918.

Combe, R.; et al. The monosodium iodoacetate model of osteoarthritis: a model of chronic nociceptive pain in rats? Neuroscience letters 2004, 370, (2-3), 236-240.

Cooper MA, et al. Fix the antibiotics pipeline. Nature. 2011;472(7341):32-32.

Creech et al., "Prevention of Recurrent Staphylococcal Skin Infections," Infect Dis Clin North Am. Sep. 2015; 29(3): 429-464.

Crofford, L. J., Use of NSAIDs in treating patients with arthritis. Arthritis research & therapy 2013, 15, (3), S2 (10 pages).

Crone S, et al. A novel in vitro wound biofilm model used to evaluate low-frequency ultrasonic-assisted wound debridement. J Wound Care. 2015;24(2):64-72.

Csafeglobal, The Cost of a Broken Vaccine Cold Chain Part Two, Financial Cost. <http://csafeglobal.com/the-cost-of-a-broken-vaccine-cold-chain-part-two-financial-cost-1> Sep. 17, 2014, 3 pages.

Cui, et al. Study on a piezoelectric micropump for the controlled drug delivery system. Microfluid. Nanofluidics 3, 377-390 (2007).

Curdy, C. et al. Piroxicam delivery into human stratum corneum in vivo: iontophoresis versus passive diffusion. Journal of Controlled Release 2001, 76, (1-2), 73-79.

Curry EJ, et al. Biodegradable nanofiber-based piezoelectric transducer. Proceedings of the National Academy of Sciences. 2020; 117(1):214-220.

Curry et al., "Biodegradable piezoelectric force sensor," PNAS, 2018, 115(5):909-914.

Curry, E. J.; et al. 3D nano- and micro-patterning of biomaterials for controlled drug delivery. Therapeutic Delivery 2016.

Da Silva et al., Biocompatibility, biodegradation and excretion of polylactic acid (PLA) in medical implants and theranostic systems. Chem. Eng. J. 340, 9-14 (2018).

Daeschlein G, et al. Antibacterial activity of positive and negative polarity low-voltage pulsed current (LVPC) on six typical Gram-positive and Gram-negative bacterial pathogens of chronic wounds. Wound Repair Regen. 2007;15(3):399-403.

Dagdeviren C, et al. Conformable amplified lead zirconate titanate sensors with enhanced piezoelectric response for cutaneous pressure monitoring. Nature Communications. 2014;5(1):4496.

Dagdeviren C, et al. Conformal piezoelectric energy harvesting and storage from motions of the heart, lung, and diaphragm. Proceedings of the National Academy of Sciences. 2014;111(5):1927.

Dagdeviren et al., "Recent progress in flexible and stretchable piezoelectric devices for mechanical energy harvesting, sensing and actuation," Extreme Mechanics Letters, 2016, 9(1):269-281.

Dai et al., "Electrospun emodin polyvinylpyrrolidone blended nanofibrous membrane: a novel medicated biomaterial for drug delivery and accelerated wound healing," Journal of Materials Science: Materials in Medicine, 2012, 23(11):2709-2716.

Das, R. et al. Biodegradable Nanofiber Bone-Tissue Scaffold as Remotely-Controlled and Self-Powering Electrical Stimulator. Nano Energy 2020, 105028.

Davidson, C. I.; et al. Airborne Particulate Matter and Human Health: A Review. Aerosol Science and Technology 2005, 39 (8), 737-749.

Degenhart et al., Histological evaluation of a chronically-implanted electrocorticographic electrode grid in a non-human primate. 13, 046019 (2016).

Deleo et al., "Reemergence of antibiotic-resistant *Staphylococcus aureus* in the genomics era," JCL, 2009, 119, 2464-2474.

Deleo FR, Diep BA, Otto M: Host defense and pathogenesis in *Staphylococcus aureus* infections. Infect Dis Clin North Am 2009, 23(1):17-34.

Demiray, "Electro-mechanical remodelling of bones," International Journal of Engineering Science, 1983, 21, (9), 1117-1126.

Derakhshandeh H, et al. A Wirelessly Controlled Smart Bandage with 3D-Printed Miniaturized Needle Arrays. Adv Funct Mater. 2020;30(13):1905544.

Desai, T. A.; et al., Nanoporous implants for controlled drug delivery. In BioMEMS and Biomedical Nanotechnology, Springer: 2006; pp. 263-286.

Di Mario et al., "Drug-eluting bioabsorbable magnesium stent", 2004, J Interv Cardiol., 17:391-395.

(56) References Cited

OTHER PUBLICATIONS

Dimitroulas, T.; et al. In Biologic drugs as analgesics for the management of osteoarthritis, Seminars in arthritis and rheumatism, 2017; Elsevier: pp. 687-691.

Dixon, W. J et al. A method for obtaining and analyzing sensitivity data. Journal of the American Statistical Association 1948, 43, (241), 109-126.

D'Lima et al. "Implantable sensor technology: measuring bone and joint biomechanics of daily life in vivo", Arthritis Research and Therapy, 2013, 15: 203.

Dominguez, C. A. et al. Sex differences in the development of localized and spread mechanical hypersensitivity in rats after injury to the infraorbital or sciatic nerves to create a model for neuropathic pain. Gender medicine 2009, 6, 225-234.

Dong P-T, et al. Photolysis of Staphyloxanthin in Methicillin-Resistant *Staphylococcus aureus* Potentiates Killing by Reactive Oxygen Species. Advanced Science. 2019;6(11):1900030.

Donnelly, R. F.; et al. Hydrogel-forming microneedle arrays for enhanced transdermal drug delivery. Advanced functional materials 2012, 22, (23), 4879-4890.

Draize, J. H. et al. Methods for the study of irritation and toxicity of substances applied topically to the skin and mucous membranes. Journal of pharmacology and Experimental Therapeutics 1944, 82, (3), 377-390.

Dwyer DJ, et al. Antibiotics induce redox-related physiological alterations as part of their lethality. Proceedings of the National Academy of Sciences of the United States of America. 2014; 111(20):E2100-2109.

Englander L, et al. Nitric oxide nanoparticle technology: a novel antimicrobial agent in the context of current treatment of skin and soft tissue infection. J Clin Aesthet Dermatol. 2010;3(6):45-50.

Eppley BL, et al. Degradation characteristics of PLLA-PGA bone fixation devices. The Journal of craniofacial surgery. 1997;8(2):116-120.

Esposito S, et al. Antimicrobial Treatment of Staphylococcus aureus in Patients With Cystic Fibrosis. Front Pharmacol. 2019; 10:849-849.

European Patent Office Extended Search Report for Application No. 18767093.0 dated Nov. 27, 2020 (13 pages).

European Patent Office Extended Search Report for Application No. 19764864 dated Mar. 22, 2022 (11 pages).

European Patent Office Partial Search Report for Application No. 19764864 dated Dec. 21, 2021 (12 pages).

Ewald et al., "Monitoring of vital signs for long-term survival of mice under anesthesia", 2011, Cold Spring Harb Protoc. 2011:pdb. prot5563.

Farah et al. Physical and mechanical properties of PLA, and their functions in widespread applications—a comprehensive review. Adv. Drug Deliv. Rev. 107, 367-392 (2016).

FDA. N95 Respirators, Surgical Masks, and Face Masks. https://www.fda.gov/medical-devices/personal-protective-equipment-infection-control/n95-respirators-surgical-masks-face-masks-and-barrier-face-coverings Last updated Jul. 19, 2022 (6 pages).

Feng, Y. et al. Engineering Spherical Lead Zirconate Titanate to Explore the Essence of Piezo-Catalysis. Nano Energy 2017, 40, 481-486.

Feng, Y.; et al. Self-Powered Electrostatic Filter with Enhanced Photocatalytic Degradation of Formaldehyde Based on Built-in Triboelectric Nanogenerators. ACS nano 2017, 11 (12), 12411-12418.

Ferreira et al., "Bone Collagen Role in Piezoelectric Mediated Remineralization," Acta Microscopica, 2009, 18(3):278-286.

Formenti, D.; et al. Thermal imaging of exercise-associated skin temperature changes in trained and untrained female subjects. Annals of biomedical engineering 2013, 41, (4), 863-871.

Fosslien, E., Adverse effects of nonsteroidal anti-inflammatory drugs on the gastrointestinal system. Annals of Clinical & Laboratory Science 1998, 28, (2), 67-81.

Foti JJ, et al. Oxidation of the Guanine Nucleotide Pool Underlies Cell Death by Bactericidal Antibiotics. Science. 2012;336(6079):315-319.

Freeman J, et al. Comparison of the efficacy of ramoplanin and vancomycin in both in vitro and in vivo models of clindamycin-induced Clostridium difficile infection. J Antimicrob Chemother. 2005;56(4):717-725.

Friebe, M.; et al. Synovial distribution of "systemically" administered acetylsalicylic acid in the isolated perfused equine distal limb. BMC veterinary research 2013, 9, (1), 56.

Frim, J. et al. Body composition and skin temperature variation. Journal of Applied Physiology 1990, 68, (2), 540-543.

Fu, C.-H. J. et al. Method for determination of aspirin and salicylic acid in rat whole blood by high pressure liquid chromatography. Analytical Letters 1985, 18, (3), 269-277.

Fukada, "New Piezoelectric polymers" 1998, Jpn J Appl Phys 37:2775-2780.

Gabriel D, et al. A photo-triggered layered surface coating producing reactive oxygen species. Biomaterials. 2013;34(38):9763-9769.

Gao, Q., et al. Ultrasound Stimulation of Different Dental Stem Cell Populations: Role of Mitogen-activated Protein Kinase Signaling. J. Endod. 42, 2016, 425-431.

Garland MJ(1), Migalska K, Mahmood TM, Singh TR, Woolfson AD, Donnelly RF. Microneedle arrays as medical devices for enhanced transdermal drug delivery Expert Rev Med Devices. Jul. 2011;8(4):459-82.

Gentile, P. et al. An overview of poly (lactic-co-glycolic) acid (PLGA)-based biomaterials for bone tissue engineering. International journal of molecular sciences 2014, 15, (3), 3640-3659.

Gibaldi, M. et al. Bioavailability of aspirin from commercial suppositories. Journal of pharmaceutical sciences 1975, 64, (6), 1064-1066.

Glazner et al., "Cost of vaccine administration among pediatric practices," Pediatrics, 2009, 124(Supplement 5):S492-S498.

Gohil, S. V. et al. Spatially controlled rhBMP-2 mediated calvarial bone formation in a transgenic mouse model. International journal of biological macromolecules 2018, 106, 1159-1165.

Golabchi et al., Melatonin improves quality and longevity of chronic neural recording. 180, 225-239 (2018).

Gordon CP, Williams P, Chan WC: Attenuating *Staphylococcus aureus* virulence gene regulation: a medicinal chemistry perspective. J Med Chem 2013, 56(4):1389-1404.

Gottlieb, H. E.; et al. Nmr Chemical Shifts of Common Laboratory Solvents as Trace Impurities. Journal of Organic Chemistry 1997, 62 (21), 7512-7515.

Graf et al., "In Stimulation of bone growth by implanted FEP electrets and PVDF piezoelectric films," Proceedings 5th International Symposium on Electrets (ISE 5), Heidelberg, 1985, pp. 813-818.

Grant SS, et al. Eradication of bacterial persisters with antibiotic-generated hydroxyl radicals. Proceedings of the National Academy of Sciences. 2012; 109(30):12147.

Grassi, M.; et al. Mathematical modelling and controlled drug delivery: matrix systems. Current drug delivery 2005, 2, (1), 97-116.

Gu, G. Q. et al. Triboelectric Nanogenerator Enhanced Nanofiber Air Filters for Efficient Particulate Matter Removal. Acs Nano 2017, 11 (6), 6211-6217.

Guerin et al., Control of piezoelectricity in amino acids by supramolecular packing. Nat. Mater. 17, 180-186 (2018).

Guo et al., "Measurements of piezoelectric coefficient d33 of lead zirconate titanate thin films using a mini force hammer", 2013, J Vib Accoust, 135:011003.

Guo, H.; et al. A pure zinc membrane with degradability and osteogenesis promotion for guided bone regeneration: in vitro and in vivo studies. Acta Biomater. 2020, 396-409.

Gurung, D. et al. Transient temperature distribution in human dermal part with protective layer at low atmospheric temperature. International Journal of Biomathematics 2010, 3, (04), 439-451.

Gustafsson, M. et al. Pain, coping and analgesic medication usage in rheumatoid arthritis patients. Patient education and counseling 1999, 37, (1), 33-41.

(56) References Cited

OTHER PUBLICATIONS

Gutarowska, B., et al. "PLA nonwovens modified with poly (dimethylaminoethyl methacrylate) as antimicrobial filter materials for workplaces." Textile Research Journal 85.10 (2015): 1083-1094.
Habibovic, "Strategic directions in osteoinduction and biomimetics," Tissue Engineering Part A, 2017, 23, (23-24), 1295-1296.
Haddadin et al., "Methicillin resistant Staphylococcus aureus (MRSA) in the intensive care unit," Postgraduate Medical Journal 2002; 78:385-392.
Hasuike A, et al. In vivo bone regenerative effect of low-intensity pulsed ultrasound in rat calvarial defects. Oral Surgery, Oral Medicine, Oral Pathology, Oral Radiology, and Endodontology. 2011; 111(1):e12-e20.
Hauert AB, Martinelli S, Marone C, Niggli V: Differentiated HL-60 cells are a valid model system for the analysis of human neutrophil migration and chemotaxis. Int J Biochem Cell Biol 2002, 34(7):838-854.
He, M. et al. Intradermal implantable PLGA microneedles for etonogestrel sustained release. Journal of Pharmaceutical Sciences 2020, 1958-1966.
He, Z. et al. An overview of hydrogel-based intra-articular drug delivery for the treatment of osteoarthritis. Colloids and Surfaces B: Biointerfaces 2017, 154, 33-39.
Hickey, D.J., et al. Electrophoretic deposition of MgO nanoparticles imparts antibacterial properties to poly-L-lactic acid for orthopedic applications. Journal of Biomedical Materials Research Part A, 2017, 105(11), 3136-3147.
Hong K-S, et al. Piezoelectrochemical Effect: A New Mechanism for Azo Dye Decolorization in Aqueous Solution through Vibrating Piezoelectric Microfibers. The Journal of Physical Chemistry C. 2012; 116(24):13045-13051.
Horodyckid et al., Safe long-term repeated disruption of the blood-brain barrier using an implantable ultrasound device: A multiparametric study in a primate model. J. Neurosurg. 126, 1351-1361 (2017).
Hossain, E.; et al. Recharging and Rejuvenation of Decontaminated N95 Masks. Physics of Fluids 2020, 32 (9), 093304.
Howard, J.; et al., An Evidence Review of Face Masks against Covid-19. Proceedings of the National Academy of Sciences 2021, 118 (4).
Hu H, et al. Stretchable ultrasonic transducer arrays for three-dimensional imaging on complex surfaces. Science Advances. 2018;4(3):eaar3979.
Huang, X.; et al. On the importance and mechanisms of burst release in matrix-controlled drug delivery systems. Journal of controlled release 2001, 73, (2-3), 121-136.
Hui J, et al. Photo-Disassembly of Membrane Microdomains Revives Conventional Antibiotics against MRSA. Advanced Science. 2020;7(6):1903117.
Iati, M. More Experts Now Recommend Medical Masks. Good Ones are Hard to Find. Feb. 2, 2021. https://www.washingtonpost.com/health/2021/02/02/medical-mask-shortage/ (4 pages).
IDATA Reasearch. 2017 US Dental Barrier Membrane Market Driven by Increased Use of Resorbable Membranes. https://idataresearch.com/2017-US-dental-barrier-membrane-market-driven-increased-use-resorbable-membranes/. Nov. 10, 2017. (6 pages).
Idbaih et al., Safety and feasibility of repeated and transient blood-brain barrier disruption by pulsed ultrasound in patients with recurrent glioblastoma. Clin. Cancer Res. 25, 3793-3801 (2019).
Ikada et al. Enhancement of bone formation by drawn poly(L-lactide). J. Biomed. Mater. Res. 30, 553-558 (1996).
Indian Office Action for Application 202037042930 dated Jun. 20, 2022 (6 pages).
Infection Control Today, "New Research Estimates MRSA Infections Cost U.S. Hospitals $3.2 Billion to $4.2 Billion Annually," <https://www.infectioncontroltoday.com/view/new-research-estimates-mrsa-infections-cost-us-hospitals-32-billion-42-billion-annually> dated May 16, 2005.
Institute of Medicine of the National Academies. Characteristics of Respirators and Medical Masks. In Reusability of Facemasks During an Influenza Pandemic: Facing the Flu, 2006; pp. 22-42.
International Preliminary Report on Patentability for Application No. PCT/US2018/022441 dated Sep. 17, 2019 (10 pages).
International Preliminary Report on Patentability for Application No. PCT/US2021/021677 dated Sep. 6, 2022 (11 pages).
International Search Report and Written Opinion for Application No. PCT/US2018/022441 dated Aug. 1, 2018 (12 pages).
International Search Report and Written Opinion for Application No. PCT/US2019/020838 dated Jun. 26, 2019 (14 pages).
International Search Report and Written Opinion for Application No. PCT/US21/53887 dated Jan. 28, 2022 (14 pages).
Jacobi, U. et al. Porcine ear skin: an in vitro model for human skin. Skin Research and Technology 2007, 13, (1), 19-24.
Jayson et al., "Intra-articular pressure in rheumatoid arthritis of the knee 3. Pressure changes during joint use", Ann Rheum Dis, 1970, 29:401-408.
Ji, W et al. Incorporation of stromal cell-derived factor-1α in PCL/gelatin electrospun membranes for guided bone regeneration. Biomaterials 34, 735-745 (2013).
Jin Y, Li M, Shang Y, Liu L, Shen X, Lv Z, Hao Z, Duan J, Wu Y, Chen C et al: Sub-Inhibitory Concentrations of Mupirocin Strongly Inhibit Alpha-Toxin Production in High-Level Mupirocin-Resistant MRSA by Down-Regulating agr, saeRS, and sarA. Front Microbiol 2018, 9:993.
Jung, Y.-s. et al. Thermo-sensitive injectable hydrogel based on the physical mixing of hyaluronic acid and Pluronic F-127 for sustained NSAID delivery. Carbohydrate polymers 2017, 156, 403-408.
Jüni, P.; et al. Intra-articular corticosteroid for knee osteoarthritis. Cochrane Database of Systematic Reviews 2015, (10) (81 pages).
Kalali Y, Haghighat S, Mahdavi M: Passive immunotherapy with specific IgG fraction against autolysin: Analogous protectivity in the MRSA infection with antibiotic therapy. Immunol Lett 2019, 212:125-131.
Kang et al., "Bioresorbable silicon electronic sensors for the brain", Nature, 2016, 530:71-76.
Kaushik, S. et al. Lack of pain associated with microfabricated microneedles. Anesthesia & Analgesia 2001, 92, (2), 502-504.
Kean, T.; et al. Biodegradation, Biodistribution and Toxicity of Chitosan. Advanced drug delivery reviews 2010, 62 (1), 3-11.
Kern, H., et al. Recovery of long-term denervated human muscles induced by electrical stimulation. Muscle & nerve 31, 98-101 (2005).
Khalid, B.; et al., Direct Blow-Spinning of Nanofibers on a Window Screen for Highly Efficient Pm2. 5 Removal. Nano letters 2017, 17 (2), 1140-1148.
Khanal, M.; et al. Injectable nanocomposite analgesic delivery system for musculoskeletal pain management. Acta biomaterialia 2018, 74, 280-290.
Kim, D.-H. et al. Sustained release of dexamethasone from hydrophilic matrices using PLGA nanoparticles for neural drug delivery. Biomaterials 2006, 27, (15), 3031-3037.
Kinoshita, N. et al. Noninvasive localized delivery of Herceptin to the mouse brain by MRI-guided focused ultrasound-induced bloodbrain barrier disruption. Proc. Natl. Acad. Sci. U.S.A. 103, 11719-11723 (2006).
Klein et al., "National Costs Associated With Methicillin-Susceptible and Methicillin-Resistant Staphylococcus aureus Hospitalizations in the United States, 2010-2014," Clinical Infectious Diseases, vol. 68, Issue 1, Jan. 1, 2019, pp. 22-28.
Klosterhoff et al., "Implantable Sensors for Regenerative Medicine", Journal of Biomechanical Engineering, ASME Feb. 2017, vol. 139, 021009-1.
Kloth, L. C. Electrical stimulation for wound healing: a review of evidence from in vitro studies, animal experiments, and clinical trials. The international journal of lower extremity wounds 4, 23-44 (2005).
Kobayashi, et al. Label-free imaging of melanoma with confocal photothermal microscopy: Differentiation between malignant and benign tissue. Bioeng. 5, 67 (2018) (18 pages).
Kohanski MA, et al. A Common Mechanism of Cellular Death Induced by Bactericidal Antibiotics. Cell. 2007;130(5):797-810.
Kozai et al., Chronic tissue response to carboxymethyl cellulose based dissolvable insertion needle for ultra-small neural probes. 35, 9255-9268 (2014).

(56) References Cited

OTHER PUBLICATIONS

Krasowska A, et al. How microorganisms use hydrophobicity and what does this mean for human needs? Front Cell Infect Microbiol. 2014;4:112-112.
Kullenberg, B. et al. Intraarticular corticosteroid injection: pain relief in osteoarthritis of the hip? The Journal of rheumatology 2004, 31, (11), 2265-2268.
Latimer, J. M. et al. Microwave Oven Irradiation as a Method for Bacterial Decontamination in a Clinical Microbiology Laboratory. Journal of Clinical Microbiology 1977, 6 (4), 340-342.
Laurencin et al., "Bone graft substitutes," Expert Review of Medical Devices, 2006, 3(1):49-57.
Laurencin et al., "Regenerative engineering," Science translational medicine, 2012, 4(160): 160ed9, 4 pages.
Laurencin et al., "Tissue engineering: orthopedic applications," Annual review of biomedical engineering, 1999, 1, (1), 19-46.
Laurencin, C. T.; et al. Delivery of small molecules for bone regenerative engineering: preclinical studies and potential clinical applications. Drug discovery today 2014, 19, (6), 794-800.
Lausen M, Pedersen MS, Rahman NSK, Holm-Nielsen LT, Farah FYM, Christiansen G, Birkelund S: Opsonophagocytosis of Chlamydia pneumoniae by Human Monocytes and Neutrophils. Infect Immun 2020, 88(7).
Leatherby, L. As Covid Cases Rise all over U.S., Lower Vaccination Rates Point to Worse Outcomes. Jul. 31, 2021. https://www.nytimes.com/interactive/2021/07/31/US/covid-delta-cases-deaths.html?action=click&module=Spotlight&pgtype=Homepage (3 pages).
Lee et al., "Micromachined piezolectric force senors based on PZT thin films", 1996, IEEE Trans Ultrason Farroelectri Freq Control, 43:553-559.
Lee et al., Lactic acid assisted fabrication of bioactive three-dimensional PLLA/B-TCP fibrous scaffold for biomedical application. Chem. Eng. J. 347, 771-781 (2018).
Lee, et al. Piezoelectric properties of electrospun poly(L-lactic acid) nanofiber web. Mater. Lett. 148, 58-62 (2015).
Leung, L. et al. Comparison of morphology and mechanical properties of PLGA bioscaffolds. Biomedical Materials 2008, 3, (2), 025006.
Lewin et al., Free serum haemoglobin is associated with brain atrophy in secondary progressive multiple sclerosis. Wellcome Open Res. 1, 10 (2016) (23 pages).
Lewitus, S. et al. The Effect of Nanoclays on the Properties of PLLA-modified Polymers Part 1: Mechanical and Thermal Properties. Journal of Polymers and the Environment 14, 171-177 (2006).
Li J, et al. Evaluation of Ultrasound-Induced Damage to *Escherichia coli* and *Staphylococcus aureus* by Flow Cytometry and Transmission Electron Microscopy. Appl Environ Microbiol. 2016;82(6):1828-1837.
Liz, et al. Using Positively Charged Magnetic Nanoparticles to Capture Bacteria at Ultralow Concentration. Nanoscale Research Letters. 2019; 14(1): 195 (8 pages).
Li, C. et al. Dual-mode operation of flexible piezoelectric polymer diaphragm for intracranial pressure measurement. Appl. Phys. Lett. 96, 053502 (2010).
Li, H. et al. Enhancing the Mechanical Properties of Electrospun Nanofiber Mats through Controllable Welding at the Cross Points. Macromolecular rapid communications 2017, 38 (9), 1600723.
Li, N.; et al. A Work Group Report on Ultrafine Particles (American Academy of Allergy, Asthma & Immunology): Why Ambient Ultrafine and Engineered Nanoparticles Should Receive Special Attention for Possible Adverse Health Outcomes in Human Subjects. Journal of Allergy and Clinical Immunology 2016, 138 (2), 386-396.
Li, P. et al. Air Filtration in the Free Molecular Flow Regime: A Review of High-Efficiency Particulate Air Filters Based on Carbon Nanotubes. Small 2014, 10 (22), 4543-4561.
Li, P. et al. Apatite formation induced by silica gel in a simulated body fluid. Journal of the American Ceramic Society 1992, 75, (8), 2094-2097.
Li, Q. et al. Involvement of the spinal NALP1 inflammasome in neuropathic pain and aspirin-triggered-15-epi-lipoxin A4 induced analgesia. Neuroscience 2013, 254, 230-240.
Li, W. et al. Rapidly separable microneedle patch for the sustained release of a contraceptive. Nature Biomedical Engineering 2019, 3, (3), 220-229.
Li, W.; et al. Long-acting reversible contraception by effervescent microneedle patch. Science advances 2019, 5, (11), eaaw8145.
Liao, L.; et al. Can N95 Respirators be Reused after Disinfection? How Many Times? ACS nano 2020, 14 (5), 6348-6356.
Liu et al., "Design and development of three-dimensional scaffolds for tissue engineering", 2007, Chem Eng Res Des, 85:1051-1064.
Liu, C.; et al. Transparent Air Filter for High-Efficiency Pm 2.5 Capture. Nature communications 2015, 6 (1), 1-9.
Liu, G. et al. Self-Powered Electrostatic Adsorption Face Mask Based on a Triboelectric Nanogenerator. ACS applied materials & interfaces 2018, 10 (8), 7126-7133.
Liu, H. et al. High-Performance Pm0. 3 Air Filters Using Self-Polarized Electret Nanofiber/Nets. Advanced Functional Materials 2020, 30 (13), 1909554.
Liu, X. et al. A biodegradable multifunctional nanofibrous membrane for periodontal tissue regeneration. Acta Biomater. 2020, 108, 207-222.
Liu, Z.; et al. Understanding the Factors Involved in Determining the Bioburdens of Surgical Masks. Annals of translational medicine 2019, 7 (23).
Lo, K. et al. Small-molecule based musculoskeletal regenerative engineering. Trends in biotechnology 2014, 32, (2), 74-81.
Lobritz MA, et al. Antibiotic efficacy is linked to bacterial cellular respiration. Proceedings of the National Academy of Sciences of the United States of America. 2015;112(27):8173-8180.
Lokuta MA, Nuzzi PA, Huttenlocher A: Analysis of neutrophil polarization and chemotaxis. Methods Mol Biol 2007, 412:211-229.
Long Y, et al. Effective Wound Healing Enabled by Discrete Alternative Electric Fields from Wearable Nanogenerators. ACS Nano. 2018; 12(12):12533-12540.
Lops, C.; et al. Sonophotocatalytic Degradation Mechanisms of Rhodamine B Dye Via Radicals Generation by Micro- and Nano-Particles of Zno. Applied Catalysis B: Environmental 2019, 243, 629-640.
Lu, W.-C. et al. Effect of magnesium on the osteogenesis of normal human osteoblasts. Magnes. Res. 30, 42-52 (2017).
Lu, X.; et al. Theoretical analysis of calcium phosphate precipitation in simulated body fluid. Biomaterials 2005, 26, (10), 1097-1108.
Ludwig, The velocity of sound through tissues and the acoustic impedance of tissues. The journal of the acoustical society of America 22, 862-866 (1950).
Lundgren, D., et al. "The use of a new bioresorbable barrier for guided bone regeneration in connection with implant installation. Case reports." Clinical Oral Implants Research 5.3 (1994): 177-184.
Luque-Agudo V, et al. Aging of Solvent-Casting PLA-Mg Hydrophobic Films: Impact on Bacterial Adhesion and Viability. Coatings. 2019;9(12) 814.
Luzuriaga MA(1), Berry DR, Reagan JC, Smaldone RA, Gassensmith JJ. Biodegradable 3D printed polymer microneedles for transdermal drug delivery. Lab Chip. Apr. 17, 2018;18(8):1223-1230.
Lv, D.; et al. Ecofriendly Electrospun Membranes Loaded with Visible-Light-Responding Nanoparticles for Multifunctional Usages: Highly Efficient Air Filtration, Dye Scavenging, and Bactericidal Activity. ACS applied materials & interfaces 2019, 11 (13), 12880-12889.
Madlon-Kay et al., "Too many shots? Parent, nurse, and physician attitudes toward multiple simultaneous childhood vaccinations," Archives of Family Medicine, 1994, 3(7):610-13.
Mahdavi, A. et al. Particle Loading Time and Humidity Effects on the Efficiency of an N95 Filtering Facepiece Respirator Model under Constant and Inhalation Cyclic Flows. Annals of Occupational Hygiene 2015, 59 (5), 629-640.
Maloney et al., "Intracranial pressure monitoring in acute liver failure: Institutional case series", 2016, Neurocrit Care 25:86-93.

(56) References Cited

OTHER PUBLICATIONS

Manoukian, M. A. C. et al. Topical administration of ibuprofen for injured athletes: considerations, formulations, and comparison to oral delivery. Sports medicine—open 2017, 3, (1), 36, 1-9.

Marzoli, F. et al. Long-lasting, antinociceptive effects of pH-sensitive niosomes loaded with ibuprofen in acute and chronic models of pain. Pharmaceutics 2019, 11, (2), 62, 1-12.

McAllister DV(1), Wang PM, Davis SP, Park JH, Canatella PJ, Allen MG, Prausnitz MR. Microfabricated needles for transdermal delivery of macromolecules and nanoparticles: fabrication methods and transport studies. Proc Natl Acad Sci U S A. Nov. 25, 2003;100(24):13755-60.

McCrudden, M. T. et al. Design and physicochemical characterisation of novel dissolving polymeric microneedle arrays for transdermal delivery of high dose, low molecular weight drugs. Journal of Controlled Release 2014, 180, 71-80.

McDannold, et al. MRI-guided targeted blood-brain barrier disruption with focused ultrasound: Histological findings in rabbits. Ultrasound Med. Biol. 31, 1527-1537 (2005).

McHugh et al., Fabrication of fillable microparticles and other complex 3D microstructures, Science, 2017, 357(6356):1138-1142.

McHugh et al., "Single-injection vaccines: Progress, challenges, and opportunities," Journal of Controlled Release, 2015, 219:596-609.

Meng et al., "A Hybrid Inductive-Ultrasonic Link for Wireless Power Transmission to Millimeter-Sized Biomedical Implats," IEEE Transactions on Circuits and Systems—II: Express Briefs, 2017, 64(10): 1137-1141.

Meylan S, et al. Targeting Antibiotic Tolerance, Pathogen by Pathogen. Cell. 2018;172(6):1228-1238.

Middleton, J. C.; Tipton, A. J., Synthetic Biodegradable Polymers as Orthopedic Devices. Biomaterials 2000, 21 (23), 2335-2346.

Mihai MM, et al. Nanomaterials for Wound Healing and Infection Control. Materials (Basel). 2019;12(13):2176.

Millius A, Weiner OD: Chemotaxis in neutrophil-like HL-60 cells. Methods Mol Biol 2009, 571:167-177.

Minary-Jolandan et al., "Nanoscale characterization of isolated individual type I collagen fibrils: Polarization and piezoelectricity", 2009, Nanotechnology 20:085706.

Moga, K. A. et al. Rapidly-dissolvable microneedle patches via a highly scalable and reproducible soft lithography approach. Advanced Materials 2013, 25, (36), 5060-5066.

Mohseni et al., "Gellan gel comprising short PVDF based-nanofibers: The effect of piezoelectric nanofiber on the mechanical and electrical behavior," Materialstoday Communications, vol. 26, Mar. 2021, 101785.

Monsen T, et al. In Vitro Effect of Ultrasound on Bacteria and Suggested Protocol for Sonication and Diagnosis of Prosthetic Infections. J Clin Microbiol. 2009;47(8):2496-2501.

Montgomery CP, Boyle-Vavra S, Daum RS: Importance of the global regulators Agr and SaeRS in the pathogenesis of CA-MRSA USA300 infection. PLoS One 2010, 5(12):e15177.

Morel CM, et al. Stoking the antibiotic pipeline. BMJ. 2010;340:1115-1118.

Nair, L. S.; et al. Polymers as biomaterials for tissue engineering and controlled drug delivery. In Tissue engineering I, Springer: 2005; pp. 47-90.

Najdovski, L. et al. The Killing Activity of Microwaves on Some Non-Sporogenic and Sporogenic Medically Important Bacterial Strains. Journal of Hospital Infection 1991, 19 (4), 239-247.

Narayanan et al., "Poly (lactic acid)-based biomaterials for orthopaedic regenerative engineering," Advanced drug delivery reviews, 2016, 107, 247-276.

Nasajpour, A. et al. A multifunctional polymeric periodontal membrane with osteogenic and antibacterial characteristics. Adv. Funct. Mater. 28, 1703437 (2018).

Nazir, M. A. Prevalence of periodontal disease, its association with systemic diseases and prevention. International journal of health sciences 11, 72 (2017), 72-80.

Neely RM, et al. Recent advances in neural dust: towards a neural interface platform. Current Opinion in Neurobiology. 2018;50:64-71.

Nguyen et al., "Piezoelectric nanoribbons for monitoring cellular deformations," Nature Nanotechnology, 2012, 7:587-593.

Nguyen et al., "Wafter-scale nanopatterning and translation into high-performance piezoelectric nanowires", 2010, Nano Lett 10: 4595-4599.

Nguyen, "A novel injectable piezoelectric hydrogel for osteoarthritis treatment," NIH Project No. 1R21AR074645-01, Award notice date: Apr. 23, 2019, Project Start Date: Jun. 1, 2019 <https://reporter.nih.gov/project-details/9651964> (3 pages).

Nguyen, et al., "Bionics in tissue engineering" 2017, Tissue Engineering for Artifical Organs, pp. 677-669.

Nicosia, A., et al. "Air filtration and antimicrobial capabilities of electrospun PLA/PHB containing ionic liquid." Separation and Purification Technology 154 (2015): 154-160.

Nielsen A, Mansson M, Bojer MS, Gram L, Larsen TO, Novick RP, Frees D, Frokiaer H, Ingmer H: Solonamide B inhibits quorum sensing and reduces *Staphylococcus aureus* mediated killing of human neutrophils. PLoS One 2014, 9(1):e84992.

Noguchi, Y. Why N95 Masks are Stil in Short Supply in the U.S. https://www.npr.org/sections/health-shots/2021/01/27/960336778/why-n95-masks-are-still-inshort-supply-in-the-u-s, Jan. 27, 2021 (17 pages).

Norman, J. J.; et al. Microneedle patches: usability and acceptability for self-vaccination against influenza. Vaccine 2014, 32, (16), 1856-1862.

Novotny et al. Molybdenum intake influences molybdenum kinetics in men. J. Nutr. 137, 37-42 (2007).

O'Dowd et al., "Face Masks and Respirators in the Fight Against the COVID-19 Pandemic: A Review of Current Materials, Advances and Future Perspectives," Materials 2020, 13(15), 3363.

Olatunji, O.; et al. Microneedle-assisted transdermal delivery of acetylsalicylic acid (aspirin) from biopolymer films extracted from fish scales. Polymer Bulletin 2018, 75, (9), 4103-4115.

Omidinia-Anarkoli, A.; et al. An Injectable Hybrid Hydrogel with Oriented Short Fibers Induces Unidirectional Growth of Functional Nerve Cells. Small 2017, 13, (36).

O'Riordan K, Lee JC: *Staphylococcus aureus* capsular polysaccharides. Clin Microbiol Rev 2004, 17(1):218-234.

Padilla F, et al. Stimulation of bone repair with ultrasound: A review of the possible mechanic effects. Ultrasonics. 2014;54(5):1125-1145.

Panieri E, et al. ROS signaling and redox biology in endothelial cells. Cell Mol Life Sci. 2015;72(17):3281-3303.

Pankey GA, et al. Clinical relevance of bacteriostatic versus bactericidal mechanisms of action in the treatment of Gram-positive bacterial infections. Clin Infect Dis. 2004;38(6):864-870.

Park, J.-H. et al. Biodegradable polymer microneedles: fabrication, mechanics and transdermal drug delivery. Journal of controlled release 2005, 104, (1), 51-66.

Parlet CP, Kavanaugh JS, Crosby HA, Raja HA, El-Elimat T, Todd DA, Pearce CJ, Cech NB, Oberlies NH, Horswill AR: Apicidin Attenuates MRSA Virulence through Quorum-Sensing Inhibition and Enhanced Host Defense. Cell Rep 2019, 27(1):187-198 e186.

Patel et al., "Development of a Sonically Powered Biodegradable Nanogenerator for Bone Regeneration", 2019, x pages.

Pathak, R. K. et al. A nanoparticle cocktail: temporal release of predefined drug combinations. Journal of the American Chemical Society 2015, 137, (26), 8324-8327.

Patrick, J.; et al. A randomized trial to assess the pharmacodynamics and pharmacokinetics of a single dose of an extended-release aspirin formulation. Postgraduate medicine 2015, 127, (6), 573-580.

Paul, et al. Novel 3D analysis of Claudin-5 reveals significant endothelial heterogeneity among CNS microvessels. 86, 1-10 (2013).

Pavel A, et al. Prophylactic Antibiotics in Clean Orthopaedic Surgery. JBJS. 1974;56(4):777-782.

Pelletier, J.-P.; et al. In Efficacy and safety of oral NSAIDs and analgesics in the management of osteoarthritis: Evidence from real-life setting trials and surveys, Seminars in arthritis and rheumatism, 2016; Elsevier: pp S22-S27.

(56) References Cited

OTHER PUBLICATIONS

Peltoniemi et al. SR-PLLA and SRPGA miniscrews: Biodegradation and tissue reactions in the calvarium and dura mater. J. Craniomaxillofac. Surg. 27, 42-50 (1999).

Peng, X., et al. "A breathable, biodegradable, antibacterial, and self-powered electronic skin based on all-nanofiber triboelectric nanogenerators." Science Advances 6.26 (2020): eaba9624.

Peterson RV, et al. The effect of frequency and power density on the ultrasonically-enhanced killing of biofilm-sequestered *Escherichia coli*. Colloids and Surfaces B: Biointerfaces. 2000; 17(4):219-227.

Poeggel et al., "Optical Fibre Pressure Sensors in Medical Applications," Sensors, 2015, 15(7):17115-17148.

Prausnitz, M. R. Engineering microneedle patches for vaccination and drug delivery to skin. Annual review of chemical and biomolecular engineering 2017, 8, 177-200.

Pressmeddelande, "Microneedle Drug Delivery Systems Market 2018 Segmentation, Demand, Growth, Trend, Opportunity and Forecast to 2023," My News Desk, <https://www.mynewsdesk.com/se/probe-way/pressreleases/microneedle-drug-delivery-systems-market-2018-segmentation-demand-growth-trend-opportunity-and-forecast-to-2023-2672909> dated Sep. 3, 2018.

Prokuski L. Prophylactic Antibiotics in Orthopaedic Surgery. JAAOS—Journal of the American Academy of Orthopaedic Surgeons. 2008; 16(5):283-293.

Qi et al., "Enhanced piezoelectricity and stretchability in energy harvesting devices fabricated from buckled PZT ribbons", 2011, Nano Lett. 11:1331-1336.

Qi et al., "Stretchable piezoelectric nanoribbons for biocompatible energy harvesting", Stretchable Electrionics, pp. 111-139.

Qian, Y. et al. Performance of N95 Respirators: Filtration Efficiency for Airborne Microbial and Inert Particles. American Industrial Hygiene Association Journal 1998, 59 (2), 128-132.

Qiu, Y. et al. Enhancement of skin permeation of docetaxel: a novel approach combining microneedle and elastic liposomes. Journal of Controlled Release 2008, 129, (2), 144-150.

Queck SY, Jameson-Lee M, Villaruz AE, Bach TH, Khan BA, Sturdevant DE, Ricklefs SM, Li M, Otto M: RNAIII-independent target gene control by the agr quorum-sensing system: insight into the evolution of virulence regulation in *Staphylococcus aureus*. Mol Cell 2008, 32(1):150-158.

Quinn, H. L. et al. Design of a dissolving microneedle platform for transdermal delivery of a fixed-dose combination of cardiovascular drugs. Journal of pharmaceutical sciences 2015, 104, (10), 3490-3500.

Ramadan et al., "A review of piezoelectric polymers as functional materials for electromechanical transducers," Smart Materials and Structures 23, 2014, 033001.

Ratajska, M. et al. Studies on the Biodegradation of Chitosan in an Aqueous Medium. Fibres & Textiles in Eastern Europe 2003, (3 (42)), 75-79.

Raynor, P. C. et al. The Long-Term Performance of Electrically Charged Filters in a Ventilation System. Journal of occupational and environmental hygiene 2004, 1 (7), 463-471.

Resistance WHO-TICGIoA: No time to wait: Securing the future from drug-resistant infections. In.; 2019.

Rigby KM, DeLeo FR: Neutrophils in innate host defense against *Staphylococcus aureus* infections. Semin Immunopathol 2012, 34(2):237-259.

Riggin, C. N.; et al. Intra-articular tibiofemoral injection of a nonsteroidal anti-inflammatory drug has no detrimental effects on joint mechanics in a rat model. Journal of Orthopaedic Research 2014, 32, (11), 1512-1519.

Ripolin, A.; et al. Successful application of large microneedle patches by human volunteers. International journal of pharmaceutics 2017, 521, (1-2), 92-101.

Rizzello L, et al. Nanotechnology tools for antibacterial materials. Nanomedicine (Lond). 2013;8(5):807-821.

Roberts, M. S et al. Percutaneous absorption of topically applied NSAIDS and other compounds: role of solute properties, skin physiology and delivery systems. Inflammopharmacology 1999, 7, (4), 339.

Robertson JMC, et al. A comparison of the effectiveness of TiO2 photocatalysis and UVA photolysis for the destruction of three pathogenic micro-organisms. Journal of Photochemistry and Photobiology A: Chemistry. 2005;175(1):51-56.

Rohrer, M. D. et al. Microwave Sterilization. Journal of the American Dental Association (1939) 1985, 110 (2), 194-198.

Rolland et al., "Direct fabrication and harvesting of monodisperse, shape-specific nanobiomaterials," Journal of the American Chemical Society, 2005, 127(28):10096-10100.

Roy S, et al. Disposable Patterned Electroceutical Dressing (PED-10) is Safe for Treatment of Open Clinical Chronic Wounds. Advances in Wound Care. 2019;8(4):149-159.

Ru et al., "Dominant B-form of poly(l-lactic acid) obtained directly from melt under shear and pressure fields", 2016, Macromolecules 49:3826-3837.

Runyan CM, et al. Low-frequency ultrasound increases outer membrane permeability of Pseudomonas aeruginosa. The Journal of General and Applied Microbiology. 2006;52(5):295-301.

Ruparelia JP, et al. Strain specificity in antimicrobial activity of silver and copper nanoparticles. Acta Biomater. 2008;4(3):707-716.

Russell, R., Non-steroidal anti-inflammatory drugs and gastrointestinal damage-problems and solutions. Postgraduate medical journal 2001, 77, (904), 82-88.

Sadorsky, P., The Effect of Urbanization and Industrialization on Energy use in Emerging Economies: Implications for Sustainable Development. American Journal of Economics and Sociology 2014, 73 (2), 392-409.

Salomoni R, et al. Antibacterial effect of silver nanoparticles in Pseudomonas aeruginosa. Nanotechnol Sci Appl. 2017;10:115-121.

Sanni et al., "Inductive and Ultrasonic Multi-Tier Interface for Low-Power, Deeply Implantable Medical Devices," IEEE Transactions on Biomedical Circuits and Systems, 2012, 6(4):297-308.

Santora, M. et al. Covid Updates: Known Global Tool Reaches 200 Millions Virus Infections. Aug. 4, 2021. https://web.archive.org/web/20210804234532/https://www.nytimes.com/live/2021/08/04/world/covid-delta-variant-vaccine (21 pages).

Sara Vanos et al., "Layerwise mechanics and finite element for the dynamic analysis of piezoelectric composite plates", 1997, Int J Solids Struct 34:359-378.

Sawano et al., "New design of actuator using shear piezoelectricity of a chiral polymer, and prototype device", 2010, Polym. Int. 59: 365-370.

Schlesinger, E. et al. Polycaprolactone thin-film drug delivery systems: empirical and predictive models for device design. Materials Science and Engineering: C 2015, 57, 232-239.

Schlesinger, E.; et al. A tunable, biodegradable, thin-film polymer device as a long-acting implant delivering tenofovir alafenamide fumarate for HIV pre-exposure prophylaxis. Pharmaceutical research 2016, 33, (7), 1649-1656.

Schmook, F. P.; et al. Comparison of human skin or epidermis models with human and animal skin in in-vitro percutaneous absorption. International journal of pharmaceutics 2001, 215, (1-2), 51-56.

Schutze GE, Hall MA, Baker CJ, Edwards MS: Role of neutrophil receptors in opsonophagocytosis of coagulase-negative staphylococci. Infect Immun 1991, 59(8):2573-2578.

Sencadas et al., Local piezoelectric activity of single poly(L-lactic acid) (PLLA) microfibers. Appl. Phys. A 109, 51-55 (2012).

Seol et al., "Hysteretic behavior of contact force response in triboelectric nanogenerator", 2017, Nano Energy 32:408-413.

Seth AK, et al. Noncontact, low-frequency ultrasound as an effective therapy against Pseudomonas aeruginosa-infected biofilm wounds. Wound Repair Regen. 2013;21(2):266-274.

Shah SR, et al. Evolving strategies for preventing biofilm on implantable materials. Materials Today. 2013;16(5):177-182.

Shah, S.; et al. Controversies and advances in non-steroidal anti-inflammatory drug (NSAID) analgesia in chronic pain management. Postgraduate medical journal 2012, 88, (1036), 73-78.

(56) References Cited

OTHER PUBLICATIONS

Shalumon KT, et al. Sodium alginate/poly(vinyl alcohol)/nano ZnO composite nanofibers for antibacterial wound dressings. Int J Biol Macromol. 2011;49(3):247-254.

Sheets, D.; et al. An Apparatus for Rapid and Nondestructive Comparison of Masks and Respirators. Review of Scientific Instruments 2020, 91 (11), 114101.

Shende et al., Micro to nanoneedles: a trend of modernized transepidermal drug delivery system, Artificial Cells, Nanomedicine, and Biotechnology, 2017, 8 pages.

Shim, J.-H. et al. Efficacy of rhBMP-2 loaded PCL/PLGA/B-TCP guided bone regeneration membrane fabricated by 3D printing technology for reconstruction of calvaria defects in rabbit. Biomedical materials 9, 065006 (2014) (9 pages).

Shokri, J.; et al. Swellable elementary osmotic pump (SEOP): an effective device for delivery of poorly water-soluble drugs. European Journal of Pharmaceutics and Biopharmaceutics 2008, 68, (2), 289-297.

Shrivastava S, et al. Characterization of enhanced antibacterial effects of novel silver nanoparticles. Nanotechnology. 2007;18(22):225103 (9 pages).

Shuai et al., "Surface modification enhances interfacial bonding in PLLA/MgO bone scaffold," Materials Science and Engineering: C, vol. 108, Mar. 2020, 110486.

Shuai, C. et al. nMgO-incorporated PLLA bone scaffolds: Enhanced crystallinity and neutralized acidic products. Materials & Design 174, 107801 (2019).

Silva, E.; et al. Pdlla Honeycomb-Like Scaffolds with a High Loading of Superhydrophilic Graphene/Multi-Walled Carbon Nanotubes Promote Osteoblast in Vitro Functions and Guided in Vivo Bone Regeneration. Materials Science and Engineering: C 2017, 73, 31-39.

Simonelli et al., "Dissolution rates of high energy polyvinylpyrrolidone (PVP)-sulfathiazole coprecipitates," Journal of pharmaceutical sciences, 1969, 58(5):538-549.

Sinatra, R. S.; et al. Efficacy and safety of single and repeated administration of 1 gram intravenous acetaminophen injection (paracetamol) for pain management after major orthopedic surgery. Anesthesiology: The Journal of the American Society of Anesthesiologists 2005, 102, (4), 822-831.

Sinderby et al., "Diaphragm activation during exercise in chronic obstructive pulmonary disease", 2001, Am J Respir Crit Care Med, 163:1637-1641.

Smith et al. Direct observation of shear piezoelectricity in poly-L-lactic acid nanowires. APL Mater. 5, 074105 (2017) (8 pages).

Soltman et al., "Inkjet-printed line morphologies and temperature control of the coffee ring effect," Langmuir, 2008, 24(5):2224-2231.

Starr MB, et al. Coupling of piezoelectric effect with electrochemical processes. Nano Energy. 2015;14:296-311.

Stokes, A.; et al. The contribution of obesity to prescription opioid use in the United States. Pain 2019, 160, (10), 2255.

Subbiahdoss G, et al. Magnetic targeting of surface-modified superparamagnetic iron oxide nanoparticles yields antibacterial efficacy against biofilms of gentamicin-resistant staphylococci. Acta Biomater. 2012;8(6):2047-2055.

Sullivan et al., "Dissolving polymer microneedle patches for influenza vaccination," Nature medicine, 2010, 16(8):915-921.

Sultana et al., Human skin interactive self-powered wearable piezoelectric bio-eskin by electrospun poly-L-lactic acid nanofibers for non-invasive physiological signal monitoring. J. Mater. Chem. B 5, 7352-7359 (2017).

Sutton et al., "Hospital-, Health Care-, and Community-Acquired MRSA: Estimates From California Hospitals, 2013," <https://www.hcup-us.ahrq.gov/reports/statbriefs/sb212-MRSA-Hospital-Stays-California-2013.jsp> dated Oct. 2016.

Syuhei et al., "Sensing using piezoelectric chiral polymer fiber", 2012, Jpn. J. Appl. Phys. 51:09LD16.

Szablowski, et al. Acoustically targeted chemogenetics for the non-invasive control of neural circuits. Nat. Biomed. Eng. 2, 475-484 (2018).

Taguchi, V. et al. Determination of drug stability in aspirin tablet formulations by high-pressure liquid chromatography. Journal of pharmaceutical sciences 1981, 70, (1), 64-67.

Tajitsu et al. Novel tweezers for biological cells using piezoelectric polylactic acid fibers. Ferroelectrics 320, 133-139 (2005).

Tajitsu et al., "Microactuators with piezoelectric polylactic acid fibers—toward the realizaation of tweezers for biological cells", 2004, Ferroelectrics 304: 195-200.

Tajitsu, Y. Fundamental study on improvement of piezoelectricity of poly(t-lactic acid) and its application to film actuators. IEEE Trans. Ultrason. Ferroelectr. Freq. Control 60, 1625-1629 (2013).

Takeuchi, H.; et al. Influence of skin thickness on the in vitro permeabilities of drugs through Sprague-Dawley rat or Yucatan micropig skin. Biological and Pharmaceutical Bulletin 2012, 35, (2), 192-202.

Talmor et al., "Mechanical ventilation guided by esophageal pressure in acute lung injury", N. Engl. J Med., 2008, 359, 2095-2104.

Tams J, et al. Poly(1-lactide) bone plates and screws for internal fixation of mandibular swing osteotomies. Int J Oral Maxillofac Surg. 1996;25(1):20-24.

Tan, et al. Studies on Thermal Decomposition Mechanism and Kinetics of Aspirin [J]. Acta Physico-chimica Sinica 2004, 1m 50-54. With English Abstract.

Tan, G., et al. "Surface-selective preferential production of reactive oxygen species on piezoelectric ceramics for bacterial killing." ACS applied materials & interfaces 8.37 (2016): 24306-24309.

Tanimoto et al., "Effect of helix inversion of poly(ß-phenethyl 1-aspartate) on macroscopic piezoelectricity," Japanese Journal of Applied Physics, 2014, 53(9S):09PC01.

Tao H, et al. Silk-based resorbable electronic devices for remotely controlled therapy and in vivo infection abatement. Proceedings of the National Academy of Sciences. 2014;111(49):17385.

Tezel A, et al. Topical Delivery of Anti-sense Oligonucleotides Using Low-Frequency Sonophoresis. Pharm Res. 2004;21(12):2219-2225.

Thakur, R. R. S.; et al. Microneedle-mediated intrascleral delivery of in situ forming thermoresponsive implants for sustained ocular drug delivery. Journal of Pharmacy and Pharmacology 2014, 66, (4), 584-595.

Thamma Vongsa V, Kim HK, Missiakas D, Schneewind O: Staphylococcal manipulation of host immune responses. Nat Rev Microbiol 2015, 13(9):529-543.

Thermofisher Scientific. Residual Solvent Analysis Information. Jul. 14, 2019. https://web.archive.org/web/20190714025617/https://www.thermofisher.com/US/en/home/industrial/pharma-biopharma/pharma-biopharma-learning-center/pharmaceutical-qa-qc-information/residual-solvent-analysis-information.html (6 pages).

Timin, A. S., et al. "Multifunctional scaffolds with improved antimicrobial properties and osteogenicity based on piezoelectric electrospun fibers decorated with bioactive composite microcapsules." ACS applied materials & interfaces 10.41 (2018): 34849-34868.

Tong SY, Davis JS, Eichenberger E, Holland TL, Fowler VG, Jr.: *Staphylococcus aureus* infections: epidemiology, pathophysiology, clinical manifestations, and management. Clin Microbiol Rev 2015, 28(3):603-661.

Tran, K. T.; et al. Lithography-based methods to manufacture biomaterials at small scales. Journal of Science: Advanced Materials and Devices 2017, 2, (1), 1-14.

Tucho, G. T.; et al., Universal Use of Face Masks and Related Challenges During Covid-19 in Developing Countries. Risk Management and Healthcare Policy 2021, 14, 511.

Ueki, H.; et al. Effectiveness of Face Masks in Preventing Airborne Transmission of Sars-Cov-2. MSphere 2020, 5(5), e00637-20.

Ummadi, S.; et al. Overview on controlled release dosage form. System 2013, 7, (8), 51-60.

Vaers, Vaccine Adverse Event Reporting System. <https://vaers.hhs.gov/data/index> webpage available as early as Oct. 9, 2009, 2 pages.

Valentini, R. F., et al. Electrically charged polymeric substrates enhance nerve fibre outgrowth in vitro. Biomaterials 13, 183-190 (1992).

(56) References Cited

OTHER PUBLICATIONS

Van Acker H, et al. The Role of Reactive Oxygen Species in Antibiotic-Mediated Killing of Bacteria. Trends in Microbiology. 2017;25(6):456-466.

Varrone JJ, de Mesy Bentley KL, Bello-Irizarry SN, Nishitani K, Mack S, Hunter JG, Kates SL, Daiss JL, Schwarz EM: Passive immunization with anti-glucosaminidase monoclonal antibodies protects mice from implant-associated osteomyelitis by mediating opsonophagocytosis of Staphylococcus aureus megaclusters. J Orthop Res 2014, 32(10):1389-1396.

Varrone JJ, Li D, Daiss JL, Schwarz EM: Anti-Glucosaminidase Monoclonal Antibodies as a Passive Immunization for Methicillin-Resistant Staphylococcus aureus (MRSA) Orthopaedic Infections. Bonekey Osteovision 2011, 8:187-194.

Vykhodtseva, et al. Progress and problems in the application of focused ultrasound for blood-brain barrier disruption. Ultrasonics 48, 279-296 (2008).

Vysakh et al., "A Comparative Analysis of Community Acquired and Hospital Acquired Methicillin Resistant Staphylococcus aureus," J Clin Diagn Res. Jul. 2013; 7(7): 1339-1342.

Walmsley, A. et al. Ultrasound in dentistry. Part 2-periodontology and endodontics. J. Dent. 20, 11-17 (1992).

Walsh C. Molecular mechanisms that confer antibacterial drug resistance. Nature. 2000;406(6797):775-781.

Wang F, Gao W, Thamphiwatana S, Luk BT, Angsantikul P, Zhang Q, Hu CM, Fang RH, Copp JA, Pornpattananangkul D et al.: Hydrogel Retaining Toxin-Absorbing Nanosponges for Local Treatment of Methicillin-Resistant Staphylococcus aureus Infection. Adv Mater 2015, 27(22):3437-3443.

Wang Y, et al. Piezo-catalysis for nondestructive tooth whitening. Nature Communications. 2020; 11(1):1328.

Wang, C. et al. Enhanced cancer immunotherapy by microneedle patch-assisted delivery of anti-PD1 antibody. Nano letters 2016, 16, (4), 2334-2340.

Wang, C. et al. Silk Nanofibers as High Efficient and Lightweight Air Filter. Nano Research 2016, 9 (9), 2590-2597.

Wang, N. et al. Tunable Fabrication of Three-Dimensional Polyamide-66 Nano-Fiber/Nets for High Efficiency Fine Particulate Filtration. Journal of Materials Chemistry 2012, 22 (4), 1445-1452.

Wang, P. et al. Ultrasmall Barium Titanate Nanoparticles for Highly Efficient Hypoxic Tumor Therapy via Ultrasound Triggered Piezocatalysis and Water Splitting. ACS nano 2021, 11326-11340.

Wang, S. et al. Controlled release of levonorgestrel from biodegradable poly (D, L-lactide-co-glycolide) microspheres: in vitro and in vivo studies. International journal of pharmaceutics 2005, 301, (1-2), 217-225.

Wang, S. et al. Electret Polyvinylidene Fluoride Nanofibers Hybridized by Polytetrafluoroethylene Nanoparticles for High-Efficiency Air Filtration. ACS applied materials & interfaces 2016, 8 (36), 23985-23994.

Wang, Z. et al. Porous Bead-on-String Poly (Lactic Acid) Fibrous Membranes for Air Filtration. Journal of colloid and interface science 2015, 441, 121-129.

Wang, Z.-F. et al. Aspirin-triggered Lipoxin A4 attenuates mechanical allodynia in association with inhibiting spinal JAK2/STAT3 signaling in neuropathic pain in rats. Neuroscience 2014, 273, 65-78.

Ward AR, et al. Comparison of Heating of Nonliving Soft Tissue produced by 45 kHz and 1 MHz Frequency Ultrasound Machines. J Orthop Sports Phys Ther. 1996;23(4):258-266.

Wartzek, et al. Triboelectricity in capacitive biopotential measurements. IEEE Trans. Biomed. Eng. 58, 1268-1277 (2011).

WHO, "New report calls for urgent action to avert antimicrobial resistance crisis," <https://www.who.int/news/item/29-04-2019-new-report-calls-for-urgent-action-to-avert-antimicrobial-resistance-crisis> dated Apr. 29, 2019.

WHO. Coronavirus Disease (Covid-19) Advice for the Public: When and How to use Masks. https://www.who.int/emergencies/diseases/novel-coronavirus-2019/advice-for-public/when-andhow-to-use-masks (Updated Dec. 2021) (12 pages).

WHO. Shortage of Personal Protective Equipment Endangering Health Workers Worldwide. https://www.who.int/news/item/03-03-2020-shortage-of-personal-protective-equipment-endangering-health-workers-worldwide. Mar. 3, 2020 (3 pages).

Wiese, A. D.; et al. Opioid analgesics and the risk of serious infections among patients with rheumatoid arthritis: a self-controlled case series study. Arthritis & rheumatology 2016, 68, (2), 323-331.

Witzleb et al. Exposure to chromium, cobalt and molybdenum from metal-on-metal total hip replacement and hip resurfacing arthroplasty. Acta Orthop. 77, 697-705 (2006).

Woltjer et al. (2016) "Optimization of piezo-MEMS layout for a bladder monitor" in 2016 IEEE International Ultrasonics Symposium (IUS) (IEEE, 2016), pp. 1-4.

Wu, S. et al. Surface Modification of Pure Magnesium Mesh for Guided Bone Regeneration: In Vivo Evaluation of Rat Calvarial Defect. Materials 12, 2684 (2019).

Wynn, R. F. et al. A small proportion of mesenchymal stem cells strongly expresses functionally active CXCR4 receptor capable of promoting migration to bone marrow. Blood 104, 2643-2645 (2004).

Xin et al., A Site-Specific Integrated Col2. 3GFP Reporter Identifies Osteoblasts Within Mineralized Tissue Formed In Vivo by Human Embryonic Stem Cells. Stem cells translational medicine 3, 1125-1137 (2014).

Xiong, Z.-C. et al. Flexible Hydroxyapatite Ultralong Nanowire-Based Paper for Highly Efficient and Multifunctional Air Filtration. Journal of Materials Chemistry A 2017, 5 (33), 17482-17491.

Xu et al., "Future of the particle replication in nonwetting templates (PR.INT) technology," Angewandte Chemie International Edition, 2013, 52(26):6580-6589.

Xu et al., "Improvements of thermal property and crystallization behavior of PLLA based multiblock copolymer by forming sterocomplex with PDLA oligomer", 2006, Polymer (Guildf), 47:3922-3928.

Xu X, et al. Strong vibration-catalysis of ZnO nanorods for dye wastewater decolorization via piezo-electro-chemical coupling. Chemosphere. 2018; 193:1143-1148.

Xu, E. G.; et al.Preventing Masks from Becoming the Next Plastic Problem. Frontiers of environmental science & engineering 2021, 15 (6), 125.

Yang, M.; et al. Is Pm1 Similar to Pm2. 5? A New Insight into the Association of Pm1 and Pm2. 5 with Children's Lung Function. Environment International 2020, 145, 106092.

Yoshida et al., "High piezoelectric performance of poly (lactic acid) film manufactured by solid state extrusion", 2014, Jpn. J. Appl. Phys. 53:09PC02.

Yoshida et al., "Piezolectric motion of multilayer film with alternate rows of optical isomers of chiral polymer film", 2011, Jpn J Appl Phys 50:09ND13.

Yoshimoto, I. et al. Development of layered PLGA membranes for periodontal tissue regeneration. Dent. Mater. 34, 538-550, (2018).

You H., et al. Strong piezo-electrochemical effect of multiferroic BiFeO3 square micro-sheets for mechanocatalysis. Electrochem Commun. 2017;79:55-58.

Yu et al., "Oral fast-dissolving drug delivery membranes prepared from electrospun polyvinylpyrrolidone ultrafine fibers," Nanotechnology, 2009, 20(5):055104, 9 pages.

Yu, J.; et al. Glucose-responsive insulin patch for the regulation of blood glucose in mice and minipigs. Nature Biomedical Engineering 2020, 1-8.

Yu, Y. et al. Multifunctions of dual Zn/Mg ion co-implanted titanium on osteogenesis, angiogenesis and bacteria inhibition for dental implants. Acta Biomater. 49, 590-603 (2017).

Zhang et al., "Piezoelectric polymer multilayer on flexible substrate for energy harvesting," IEEE Transactions on Ultrasonics, Ferroelectrics, and Frequency Control, 2013, 60(9):2013-2020.

Zhang, H. et al. Drug delivery systems for differential release in combination therapy. Expert opinion on drug delivery 2011, 8, (2), 171-190.

Zhang, J. et al. Biodegradable Electrospun Poly (Lactic Acid) Nanofibers for Effective Pm 2.5 Removal. Macromolecular Materials and Engineering 2019, 304 (10), 1900259.

(56) References Cited

OTHER PUBLICATIONS

Zhang, Q.; et al. Transboundary Health Impacts of Transported Global Air Pollution and International Trade. Nature 2017, 543 (7647), 705-709.

Zhang, R. et al. Nanofiber Air Filters with High-Temperature Stability for Efficient Pm2. 5 Removal from the Pollution Sources. Nano letters 2016, 16 (6), 3642-3649.

Zhang, S.; et al. Spider-Web-Inspired Pm0. 3 Filters Based on Self-Sustained Electrostatic Nanostructured Networks. Advanced Materials 2020, 32 (29), 2002361.

Zhang, Y. et al. Preparation of Nanofibrous Metal-Organic Framework Filters for Efficient Air Pollution Control. Journal of the American Chemical Society 2016, 138 (18), 5785-5788.

Zhao et al., Electrospun poly(L-lactic acid) nanofibers for nanogenerator and diagnostic sensor applications. Macromol. Mater. Eng. 302, 1600476 (2017).

Zheng et al., "Biodegradable triboelectric nongenerator as a lifetime designed implantable power source", 2016, Sci Adv 2:e1501478.

Zhou Y, Niu C, Ma B, Xue X, Li Z, Chen Z, Li F, Zhou S, Luo X, Hou Z: Inhibiting PSMalpha-induced neutrophil necroptosis protects mice with MRSA pneumonia by blocking the agr system. Cell Death Dis 2018, 9(3):362.

Zhu X, et al. Nanomedicine in the management of microbial infection—Overview and perspectives. Nano Today. 2014;9(4):478-498.

Zi et al., "Triboelectric-pyroelectric-piezoelectric hybrid cell for high-efficiency energy-harvesting and self-powered sensing", Adv Mater 27:2340-2347, 2015.

Curry et al., Supporting Information Appendix. Biodegradable piezoelectric force sensor. PNAS. Jan. 2018 pp. 1-33 (Year: 2018).

Abrigo, M. et al. "Electrospun nanofibers as dressings for chronic wound care: advances, challenges, and future prospects." Macromolecular bioscience 14.6 (2014): 772-792.

Santoro, M. et al. "Poly (lactic acid) nanofibrous scaffolds for tissue engineering." Advanced drug delivery reviews 107 (2016): 206-212.

\* cited by examiner

BIODEGRADABLE PIEZOELECTRIC COMPOSITE MATERIALS

CROSS-REFERENCE TO RELATED APPLICATIONS

This application is a non-provisional of and claims the benefit of U.S. Provisional Patent Application No. 63/050,478, filed on Jul. 10, 2020. This application also is a continuation-in-part application of U.S. patent application Ser. No. 17/342,470, filed on Jun. 8, 2021, which claims the benefit of U.S. Provisional Patent Application No. 63/035,891, filed on Jun. 8, 2020. The contents of all the foregoing applications are incorporated herein by reference.

BACKGROUND

Periodontitis is a common and destructive dental disease in human. According to the data provided by Centers for Disease Control and Prevention (USA), 47.2% of adults aged 30 years and older have some forms of periodontal disease and 70.1% of adults 65 years and older have periodontal disease. Treatments for periodontitis include the use of conventional anti-bacterial measures (i.e. antibiotics), Guided Bone Regeneration (GBR), and applications of cytokines, growth factors, etc. which aim to regenerate all components of periodontium. While the use of antibiotics become problematic with the appearance of bacterial resistant strains, the use of biochemical agents (i.e. cytokines and growth factors) pose a significant risk of toxicity and side-effects. As such, the GBR approach, which uses biodegradable or non-biodegradable barrier membranes acting as barriers to prevent soft-tissue invasion into the defect and maintain the space to guide dental-bone regeneration, has been the most commonly used means for periodontal treatment in clinic.

SUMMARY

Disclosed is a novel biodegradable and biocompatible barrier membrane of piezoelectric nano composites of Metallic Oxide (MO) (e.g., Magnesium oxide, Zinc oxide and iron oxide)-PLLA (Poly-L-lactide), which can be subjected to acoustic pressure from ultrasound, to generate useful electrical charge for enhanced bone regeneration and enhanced antibacterial effects for guided bone regeneration to treat dental diseases such as periodontitis, gingivitis, and gum recession. PLLA can be replaced with other biodegradable materials such as silk or polyglycine, fabricated in the same manner (e.g. electrospinning or thermal-stretching) to be deployed with piezoelectricity.

The disclosure provides, for the first time, (1) a wireless and non-invasive ultrasonic technology to generate electrical stimulation for inducing tissue and bone growth and killing bacteria at the same time, (2) a tool to systematically study interaction between stem-cells and surface charge for bone regeneration and bacteria killing, and (3) an approach to design and create a novel nanomaterial-based biodegradable piezoelectric membrane which can form a highly-regenerative replacement barrier membrane for treatment of dental diseases.

As nerve, muscle, skin, and cartilage, etc. can be healed under electrical stimulation, the proposed membrane and the stimulation method could be used to repair various tissue defects, offering a powerful platform technology for tissue regeneration.

In one embodiment, the invention provides a composite material comprising a biodegradable piezoelectric material and a plurality of metal oxide particles mixed with the biodegradable piezoelectric material. When an application of ultrasound is applied to the composite material an electrical charge is generated on the piezoelectric material to release ions from the metal oxide particles to generate bone and provide antibacterial effects for treatment of disease in a subject.

In another embodiment, the invention provides a method of treating a dental disease in a subject in need thereof. The method comprising applying a composite material to a dental tissue of the subject, the composite material comprising a biodegradable piezoelectric material and a plurality of metal oxide particles, applying ultrasound energy to the composite material, and generating an electrical charge on at least a portion of a surface of the composite material.

In yet another embodiment, the invention provides a method of making a biodegradable piezoelectric composite material. The method comprising combining a piezoelectric biodegradable polymer in a first solvent and a plurality of metal oxide particles in a second solvent to provide a mixture, electrospinning the mixture onto a collector drum having a speed of about 0.1 rpm to about 6,000 rpm to provide a fiber mesh, annealing the fiber mesh between 100° C. to 115° C. for a first period of time, and annealing the fiber mesh between 150° C. to 170° C. for a second period of time.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 graphically illustrates open circuit output voltage from MgO-PLLA and PLLA film fabricated with the same electrospun speed responding to 1 MHz ultrasound waves. (a) Response between off and on of the ultrasound waves. (b) Output voltage response when ultrasound waves are on.

DETAILED DESCRIPTION

Figure 1:
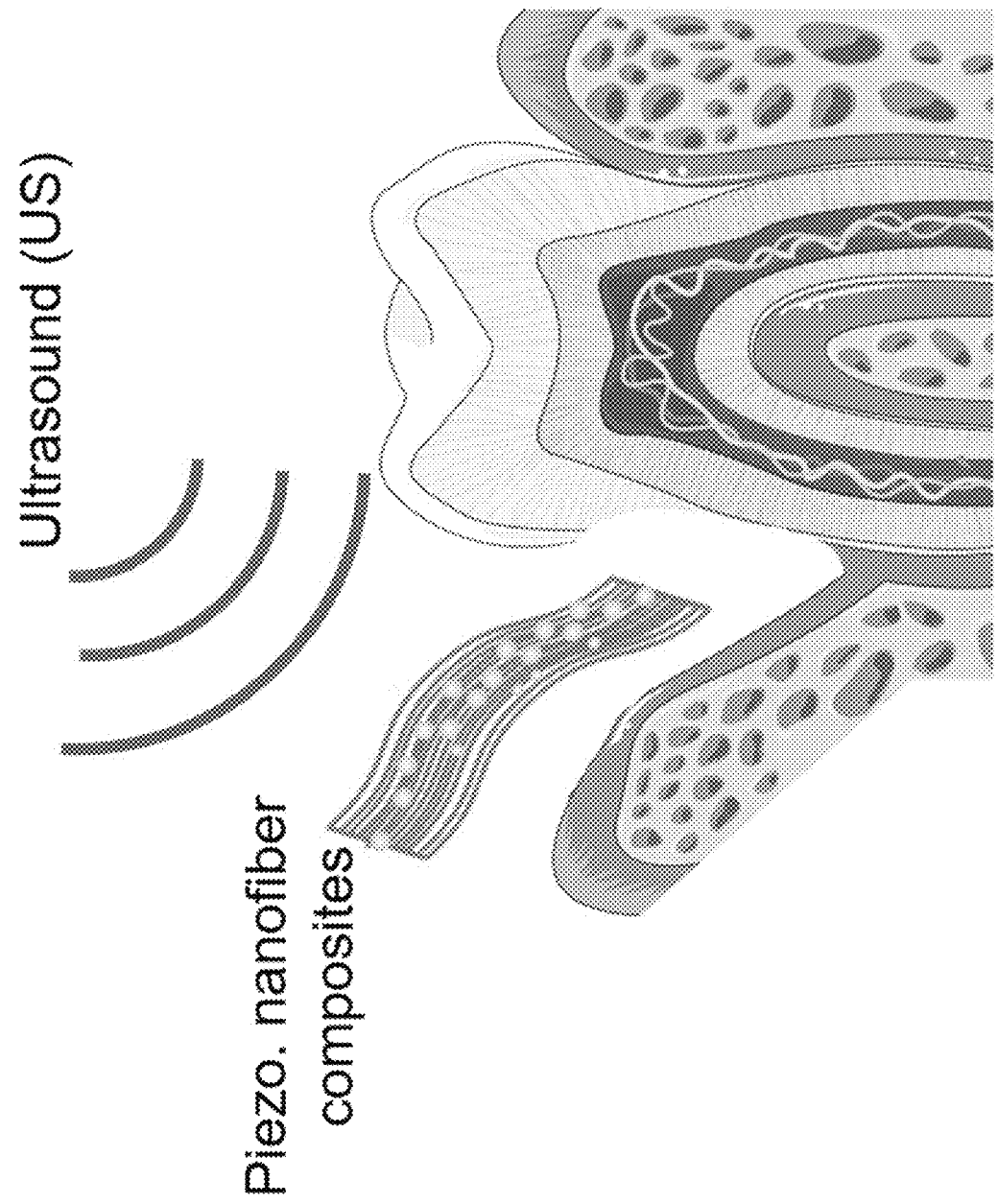
FIG. 1 is a schematic diagram illustrating biodegradable piezoelectric PLLA-MgO composites for treating periodontitis. Under ultrasound (US), acoustic pressure is induced on the PLLA piezoelectric nanocomposites to produce surface charges which together with released ions to enhance osteogenesis and antibacterial effects, and therefore treat periodontitis. The portable US stimulation can be performed at home, helping patients to avoid frequent/repeated dental centers.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example, "about 1" may also mean from 0.5 to 1.4.

The term "dental tissue," as used herein, refers to any tissue associated with the oral cavity (e.g., mouth) and adjacent structures and tissues including the maxillofacial (e.g., jaw and facial) area. Examples of dental tissue include, but are not limited to, teeth and periodontium.

The term "dental disease," as used herein, refers to any disease, disorder, or condition associated with dental tissue. An example of a dental disease includes, but is not limited to, periodontitis.

A "subject" or "patient" may be human or non-human and may include, for example, animal strains or species used as "model systems" for research purposes, such as a mouse model. Likewise, patient may include either adults or juveniles (e.g., children). Moreover, patient may mean any living organism, preferably a mammal (e.g., human or non-human) that may benefit from the administration of composite materials contemplated herein. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. In some embodiments of the methods and composite materials provided herein, the mammal is a human.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Composite Materials

Disclosed herein are composite materials that comprise a biodegradable piezoelectric material, and a plurality of metal oxide particles. The composite materials can also be referred to as nanocomposites or nanocomposite materials.

GBR, generally, can use a biodegradable or non-biodegradable barrier membrane that acts as a barrier to prevent soft-tissue invasion into the defect and maintain the space to guide the bone regeneration, and is a clinical approach for periodontal regeneration. The desired barrier membrane can be biocompatible, occlusive, easy-handling, bioactive and provide good space maintenance. Besides, it would be useful if the membrane can be biodegradable and antibacterial. Biodegradable barrier membranes have their advantage over nonbiodegradable counterparts that they do not need a second surgery after healing. A commercial product Guidor®, which is based on the blend of PDLA and PLLA with additional acetyl tri-n-butyl citrate uses a 2-layer structure. However, this and other approaches are deficient to all or some of the many desired properties for an ideal GBR membrane. Thus, there is a need to devise a new approach, effectively utilizing electrical stimulation in combination with biomaterial membranes to treat periodontitis.

This disclosure provides an innovative GBR membrane which is safe, biodegradable, highly anti-bacterial and osteogenic to provide a treatment for periodontitis. FIG. 1 schematically illustrates a biodegradable piezoelectric PLLA-MgO composite being stimulated with ultrasound for treating dental disease. In some embodiments, the composite material can be used as a membrane for GBR. A novel approach was applied to generate controlled surface charge that drives bone regeneration and kills bacteria at the same time. The surface charge was produced and fine-tuned by combining, the use of MO/PLLA (metal oxides/Poly-L-lactide) piezoelectric nanocomposites and non-invasive ultrasound which is commonly used for dental hygiene/treatment. A novel approach was employed to combine surface charge and metal ion release, creating a synergistic effect that promotes bone regeneration. It was the first time that charge-generated reactive oxidative species (ROS) can be used in a combination with physical stimulation of ultrasound (acoustic wave) to create an antibacterial property that can kill antibiotic-resistant strains.

The nanocomposite allows one to easily obtain different mechanical strength, pore-size and flexibility by tuning the composition and fabrication/processing-conditions to create the desired MO/PLLA composites suitable for dental implants. In addition, piezoelectric performance and degradation profile (based on MO concentration and processing-conditions) can be tailored. Together, this control over various properties is an innovative and powerful characteristic of the disclosed GBR membrane that has not been achieved in conventional GBR biomaterials.

The PLLA/MO nanocomposite membrane can be made by electrospinning and all materials used (PLLA and MO) have been shown to be biodegradable and safe for use in many FDA approved and/or CE marked medical implants. The applied US is also commonly used for dental cleaning. As such this is a highly translational biomaterial.

Thus, a combination of novel concepts (charge-induced bone regeneration and antibacteria), and new approaches (combining surface charge, ultrasound and nutrition ion (i.e., Mg, Fe and Zn) release to enhance/induce dental bone growth) along with the use of a piezoelectric nanocomposite with highly-tunable mechanical/degradation properties can create a powerful, highly-controllable GBR membrane for treating periodontitis.

To fabricate piezoelectric MO-PLLA nanocomposites, electrospinning techniques were used. Specifically, PLLA was dissolved in Dichloromethane (DCM) and MO NPs were suspended in Dimethylformamide (DMF) by means of sonication. After that, the two were mixed well and allow another 1 h sonication for well-distribution of MO NPs in the mixture. A high voltage (~14 kV) is applied between the injection metal needle and the collector drum, and the speed of the drum is adjusted (0~4000 rpm) to mechanically stretch and align the nanocomposites. The speed of the drum is an important factor affecting the piezoelectricity performance of the nanocomposite. To not compromise piezoelectric performance after the addition of MO NPs, an additional post annealing at sequential temperatures of ~112° C. (~10 hours) and ~166° C. (~10 hours) is applied to obtain high crystallinity and stabilize the nanocomposites. A series of MO-PLLA with different MO content (0.1%-30%. wt. %) are fabricated. To evaluate the microstructure of the nanocomposites, we employ scanning electron microscope (SEM) coupled with energy dispersive X-ray (EDX) to verify the existence of PLLA and Mg in the composites. Besides, 1D X-ray diffraction (XRD) and 2D XRD will be adopted to determine the phase composition. To evaluate the crystallinity of the nanocomposite, differential scanning calorimetry (DSC) is utilized.

To control the mechanical properties of the nanocomposite, a universal mechanical testing machine (Instron 5542) is utilized by doing a uniaxial tensile strength test. Rectangular-shaped samples of 20 mm×5 mm are tested with a crosshead speed at 10 mm min'. For adhesion property, contact angle test is done on 10×10 mm sample surface. The contact angles of droplets of distilled deionized (DI) water on the surface of the polymer films are measured using a digital contact angle measurement system equipped with a CCD camera (CAM 100 series, KSV Instruments). Temporal images of the water droplet on different polymer films are recorded, as well as the contact angle values. In parallel to our MgO/PLLA nanocomposite films, we will perform the same tests on a commercial GBR membrane (Guidor) for use as a benchmark. To control and engineer mechanical properties of the membrane, we can vary the concentration of MgO (metal oxide nanoparticles) and/or vary material-processing parameters (e.g. annealing temperature, electrospinning fluid/jet/collector speeds) as well as change dimensions of the film.

Figure 4:
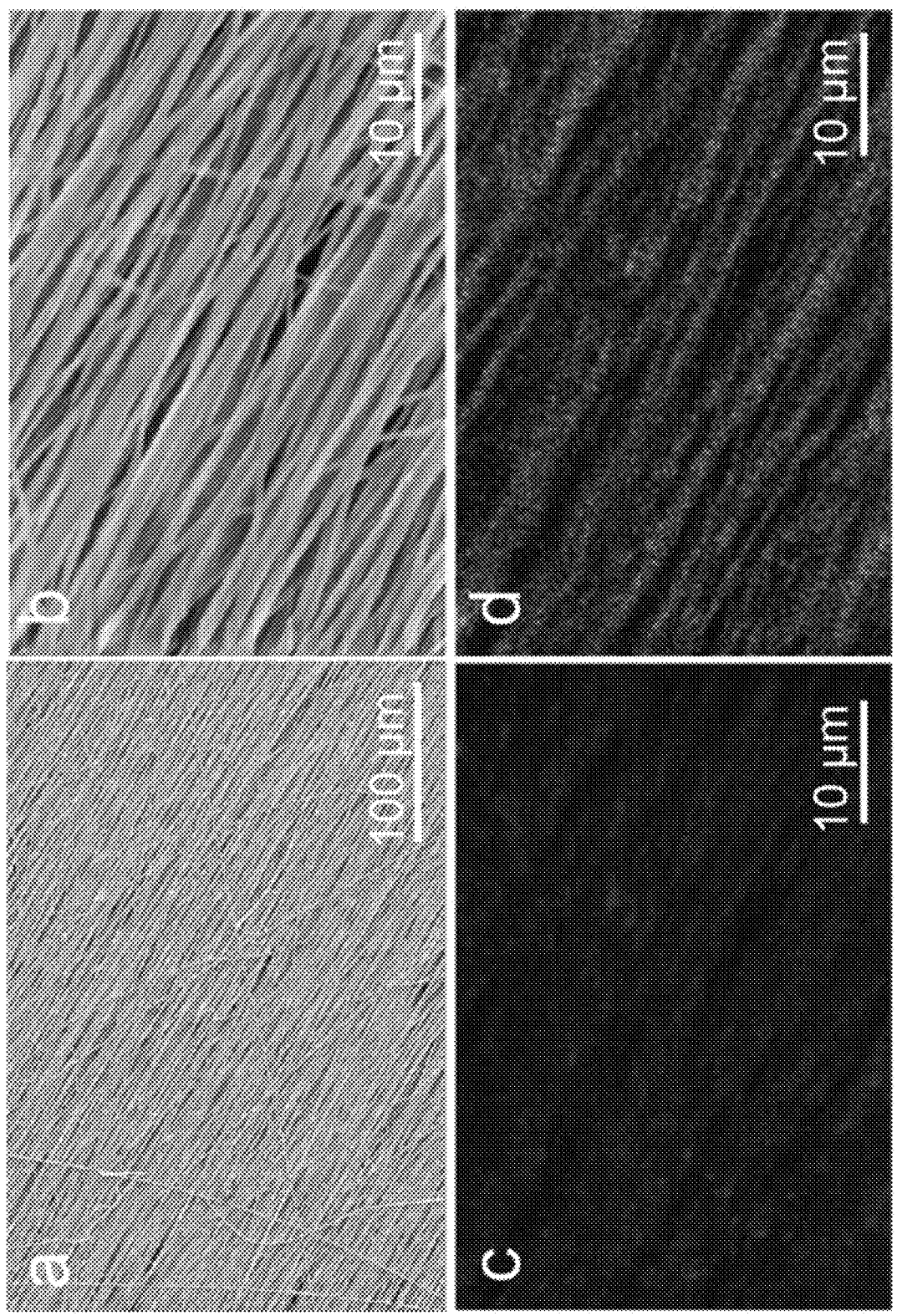
FIG. 4 illustrates micrograph images of achieved MgO-PLLA nanofibers. (a) Morphology of MgO-PLLA film. (b) Zoomed-in microstructure of MgO-PLLA. (c) Magnesium (Mg) distribution in b. (d) Oxygen (O) distribution in b.

Achievement of MO-PLLA barrier membrane: We were able to achieve highly-aligned PLLA nanocomposites with MgO NPs, using electrospinning system. The thickness of the membrane after treatment is around 30 In some embodiments, the nanocomposite is a single layer. In other words, in some embodiments, the nanocomposite is not a multilayered material. ICP-OES results confirmed the concentration of MgO to be 5.0±0.6%, which was identical to that of MgO added to the solution for electrospinning. FIG. 4 shows the SEM and coupled EDS results of 5% MgO-PLLA after electrospinning followed by heat treatment described before. The results confirmed the successful incorporation of MgO nanoparticles in PLLA. Based on the EDS results, it can be concluded that the MgO is uniformly distributed in the PLLA nanocomposites. This was further confirmed by XRD (FIG. 5 at (a)), with the peak of MgO (MgO (200)) identified on the spectrum.

Figure 5:
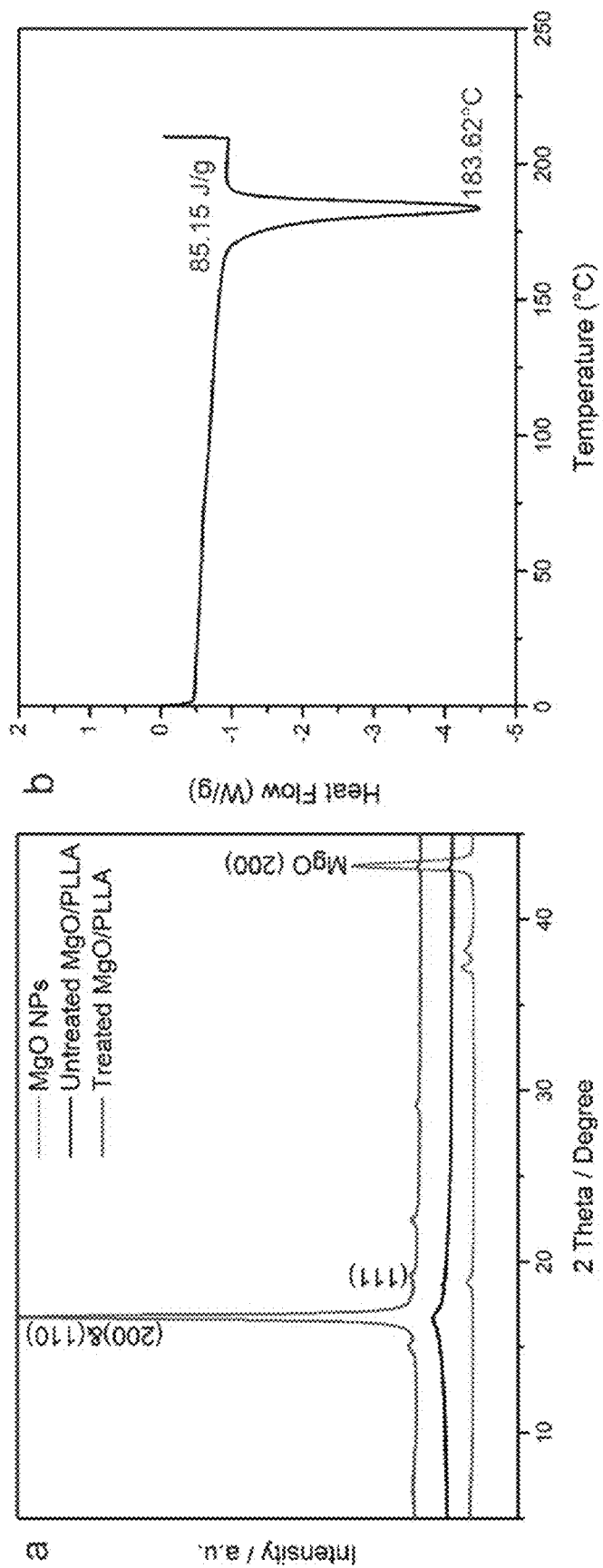
FIG. 5 graphically illustrates characterization of MgO-PLLA film. (a) XRD patterns. The peak for MgO (200) confirmed the existence of MgO in both untreated film and treated film. (b) DSC melting endotherm for MgO-PLLA. The Enthalpy (integrated area under the melting curve) is determined to be 85.15 J/g. Using the estimated enthalpy of fusion for Pure PLLA (93.6 J/g), the crystallinity was estimated about 91%.
Figure 6:
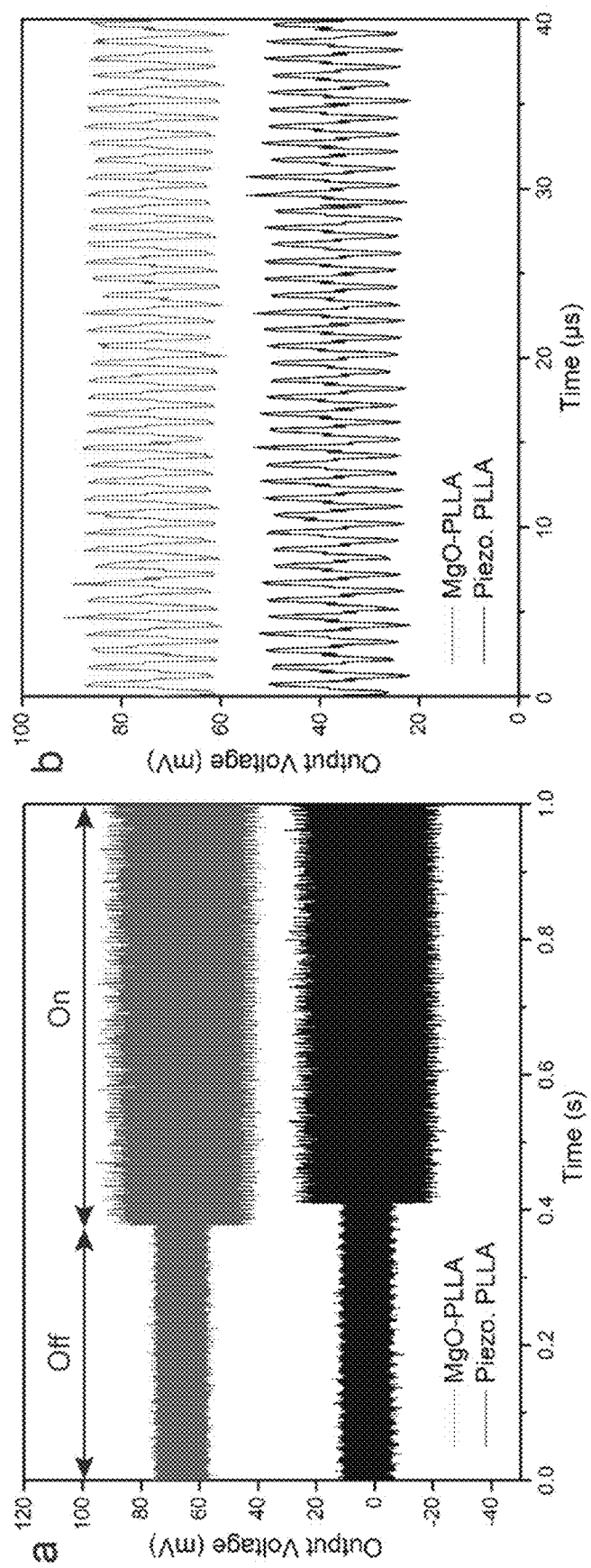

The crystallinity of the MgO was calculated based on the DSC curve (FIG. 5 at (b)). The estimated enthalpy of fusion for Pure PLLA is known to be 93.6 J/g. By using this, the calculated crystallinity for MgO-PLLA is around 91%, which is higher compared with the piezoelectric PLLA fabricated (without MgO) and treated under the same condition (~88%). We further evaluated the piezoelectricity of the membrane by measuring the open circuit output voltage responding to 1 MHz ultrasonic waves (FIG. 6). The transducer made by MgO-PLLA film and PLLA film showed similar responsive output voltage, which not only confirmed the existence of piezoelectricity inside MgO-PLLA film, but also implied that the addition of 5 wt. % MgO NPs didn't compromise the piezoelectricity. This set the foundation for our hypothesis to combine both effects of piezoelectricity and Mg release.

Figure 7:
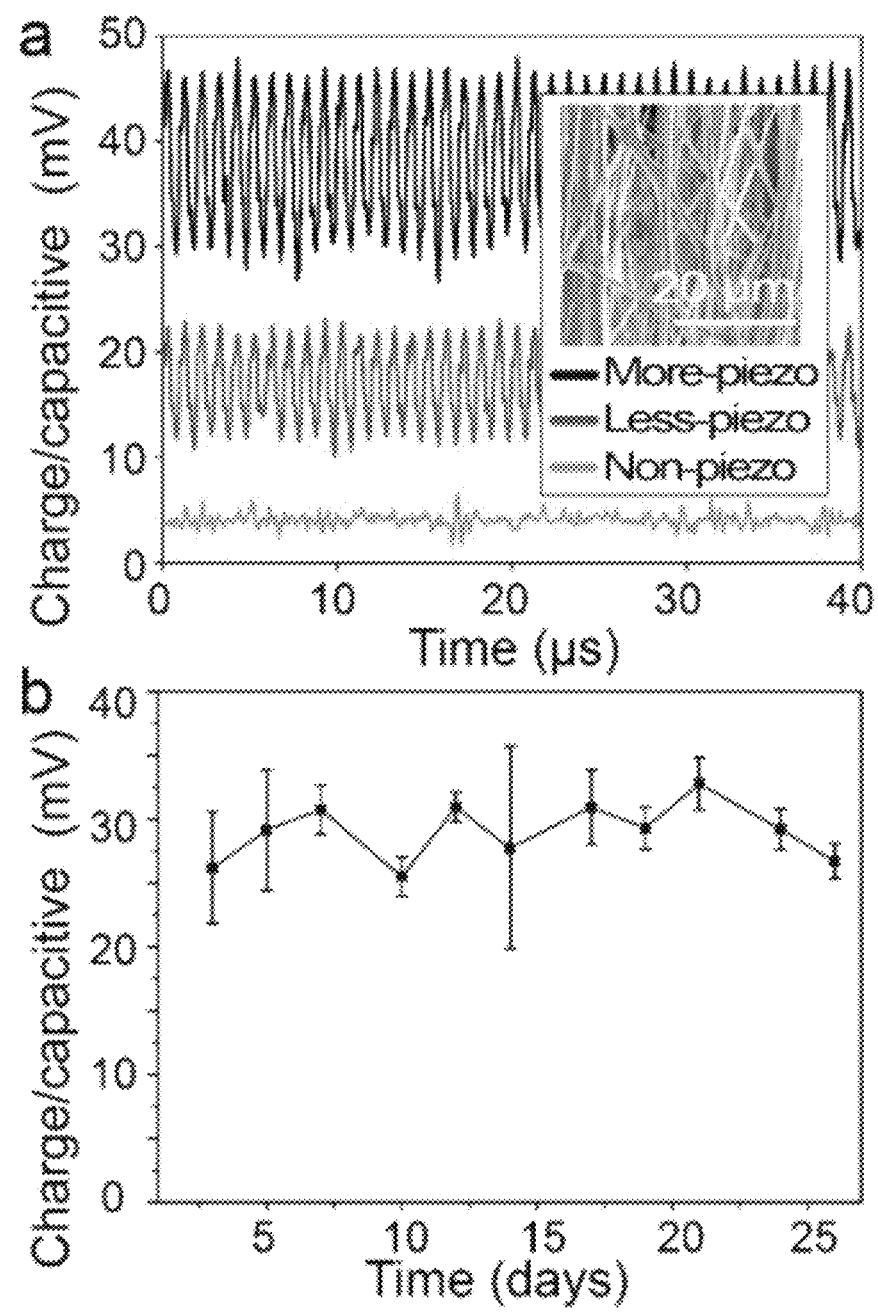
FIG. 7 graphically illustrates the sustained and well-controlled surface charge generated by the piezo-PLLA nanofiber mats with applied US. (a) Three different PLLA nanofiber samples with and without piezoelectric effect in response to the same applied US. (b) Sustained charge, generated by the piezo-PLLA for 25 days inside PBS at 37° C.

We have shown that PLLA nanocomposite films, made with different collector spin speeds, can provide different levels of piezoelectricity. The piezoelectric PLLA film when conditioned inside PBS at 37° C. can provide a sustained and stable charge over a period of 1 month under application of external ultrasound as seen in FIG. 7. The long period to sustain the piezoelectric charge is important to our lengthy process of potentially culturing cells and implanting the piezoelectric GBR membrane for dental stimulation/regeneration.

Ultrasound parameter selection: Ultrasound (US) can be performed daily with varying intensity. The acoustic energy from low-frequency kilohertz ultrasound (20-60 kHz) emitted by an oscillating tip of clinical dental scalers is used for surface cleaning by disrupting calculus, debris, and bacteria on the external or internal surfaces of the tooth, demonstrating the safety of the US frequency range for clinical dental therapy. Therefore, our frequency is set at 40 kHz to simplify the experiment. Higher frequency (e.g. in MHz range) that is used frequently in clinical settings for imaging can also be used for this application. Intensity of the US will be varied to achieve different outcomes of GBR.

Figure 8:
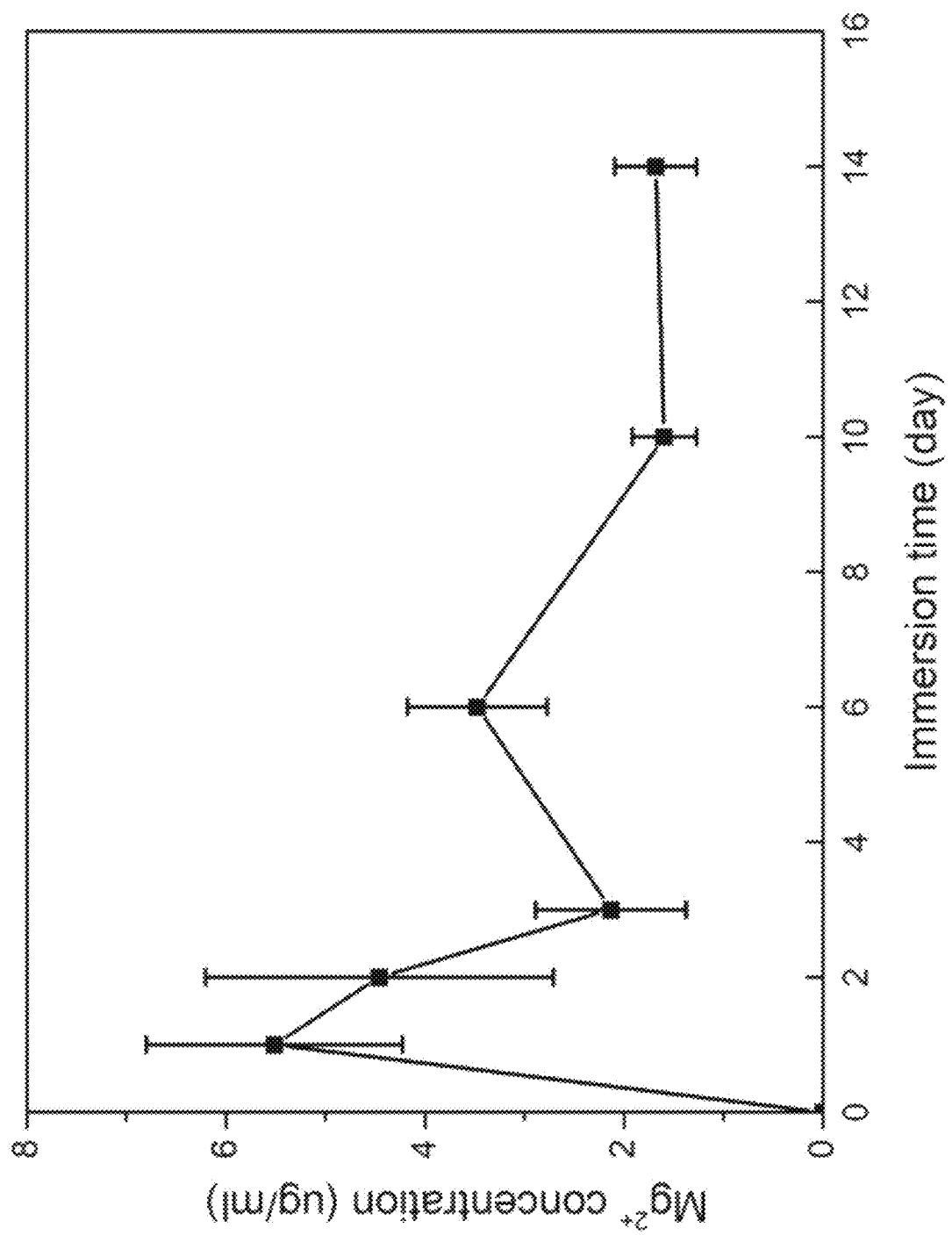
FIG. 8 graphically illustrates a release profile of MgO-PLLA in magnesium-free HBSS. Medium gathered and replaced every day.

FIG. 8 shows the release profile of Mg2+ from a 10×10 mm MgO-PLLA (5% MgO, wt. %) membrane. The estimated Mg2+ released at Day 1 was around 5.5 µg/mL (~0.25 mM), then decreased and stabilized at Day 10. To note, previous reports have demonstrated the enhanced osteogenic effects with the release of Mg2+ ranging from 0.06 µg/mL to 48 µg/mL (~2 mM) in vitro and in vivo. Thus, our preliminary study here shows a suitable range of Mg2+ which is favorable for promoting bone and dental regeneration.

Figure 9:
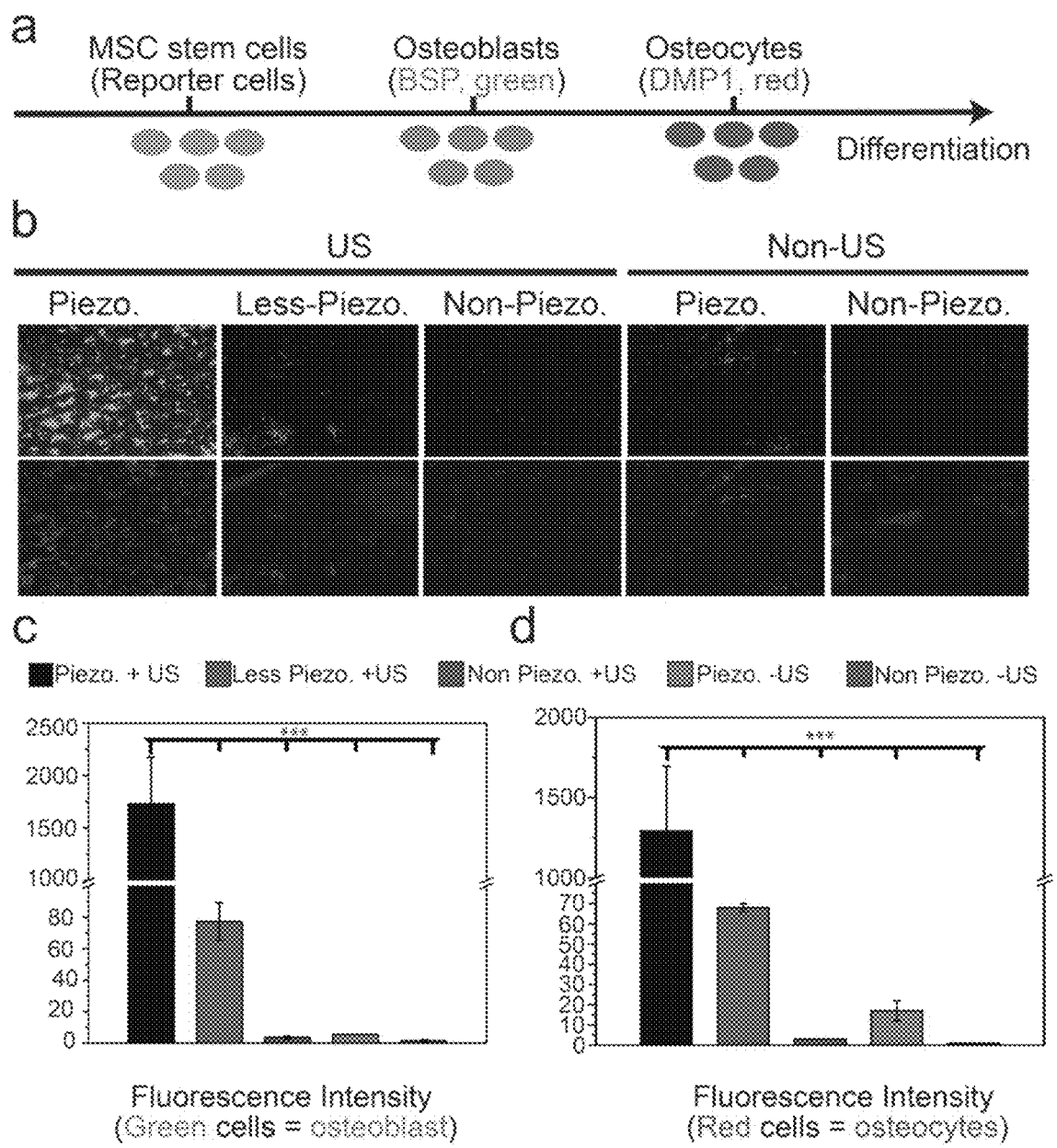
FIG. 9 illustrates osteogenic activity of BMSCs with reporter genes when grown on the PLLA scaffolds with US treatment. (a) Schematic of the progressive expression from BSP to DMP. (b) Fluorescent images of the cells observed under the GFP and cherry red channel after 3 days US, 20 mins/day. (c) and (d) represent the fluorescent expressions quantitively and provide a graphical comparison between each group (two tailed t-test; *=0.01, =0.001 and *=0.0001.

Besides, we demonstrate the osteogenic effects of piezoelectric PLLA and MgO-PLLA in vitro. FIG. 9 showed the in vitro osteogenic effects of piezoelectric PLLA by using primary bone marrow stem cells (BMSCs) with reporters for bone sialoprotein (BSP-GFP-topaz, green) and dentin matrix 421 protein (DMP1-RFP-mCherry, red). FIG. 9 at (a) demonstrates the schematically progressive expression from BSP to DMP for the BMSCs that underwent osteogenic differentiation and changes in fluorescence throughout. It could be found that the piezoelectric PLLA with ultrasound treatment helped turn on the reporter genes that represent osteogenic differentiation. This implied that the piezoelectric PLLA after ultrasound treatment had improved osteogenic effects.

Figure 10A:
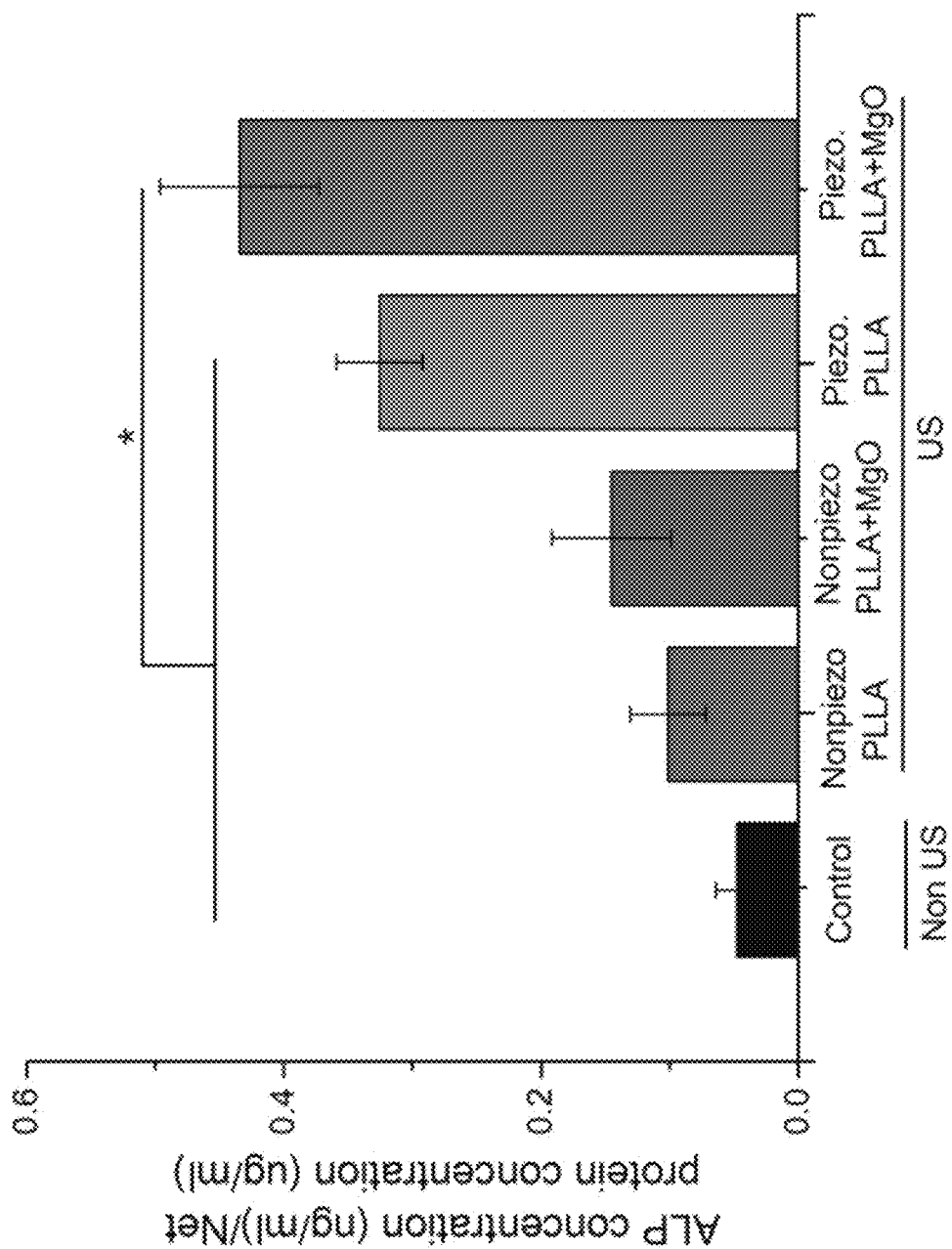
FIGS. 10A and 10B graphically illustrate ALP activity. (b) ALP expression from hPDLSCs cultured on different membrane surface after 14 days in growth medium. The US treatment (produces ~120 pC charge) was done 20 min/d. * represents a significance level of 0.05.
Figure 10B:
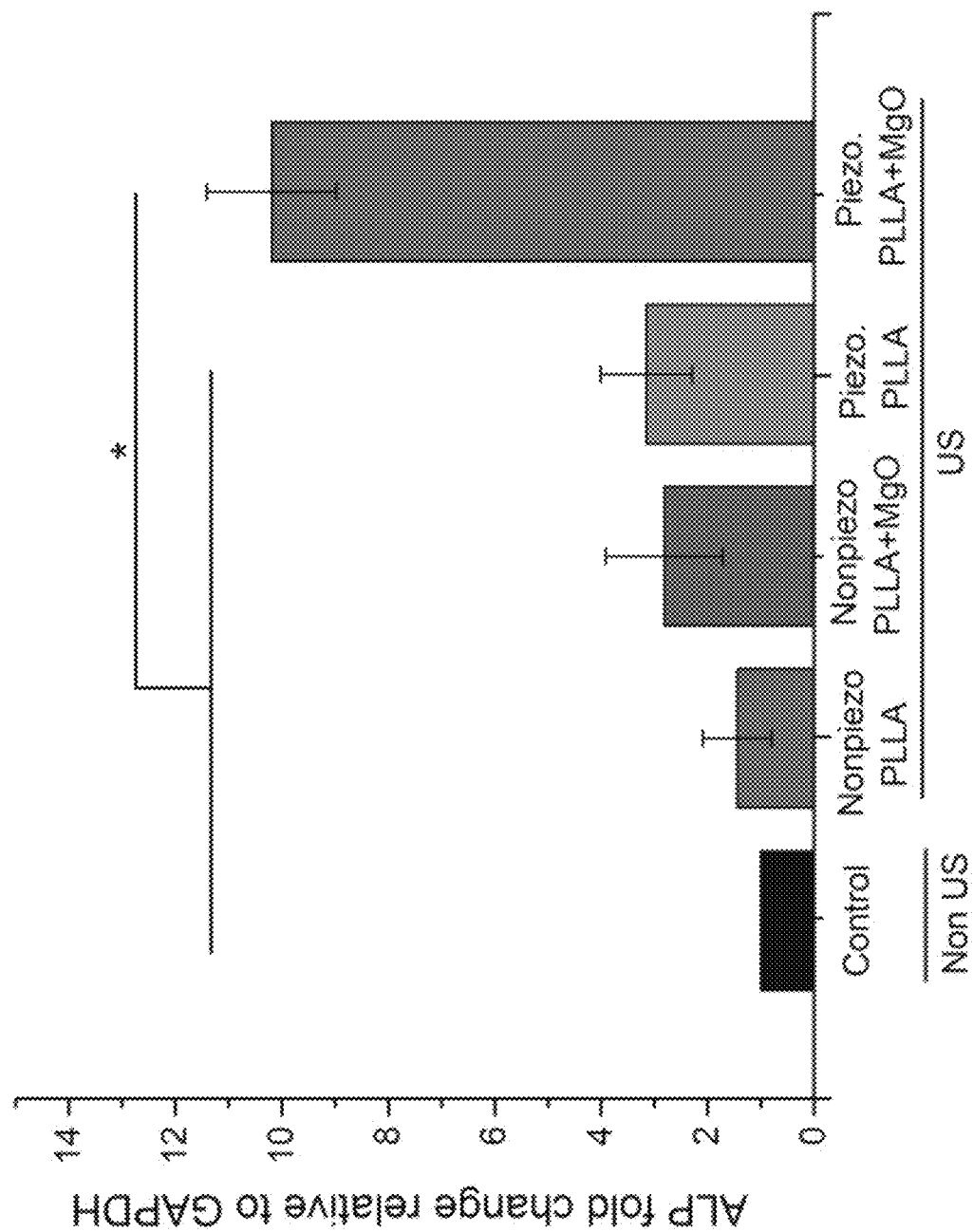

FIG. 10 demonstrates the Alkaline Phosphate (ALP) results of hPDLSCs cultured on MgO-PLLA (5% MgO, wt. %) membrane after 14 days US treatment in growth medium. The hPDLSCs cultured on piezoelectric MgO-PLLA membrane presented significantly higher ALP activity than any other groups.

EXAMPLES

A GBR membrane is desirable to be biocompatible, antibacterial, occlusive to soft tissue penetration, easy-handling, and bioactive while providing good space maintenance. Besides, the membrane should be biodegradable to avoid the second invasive removal surgery which can damage dental tissues after healing.

Current biomaterials, used for available GBR membranes, including metals (Titanium), natural polymer-based membranes (i.e. collagen, chitosan, gelatin and silk fibroin, etc.) and synthetical polymer-based membranes (i.e. Polytetrafluoroethylene, poly(lactic acid), poly(glycolic acid), poly (ε-caprolactone), poly(hydroxyl valeric acid), poly(hydroxyl butyric acid) and their copolymers) however struggle with major problems of being (1) too stiff or too soft, (2) non-degradable or rapidly degraded, and (3) lacking of the ability to generate dental bone and kill bacteria.

Piezoelectricity is a phenomenon which allows materials to generate electrical signals from deformation and vice versa. Piezoelectric materials can be utilized to stimulate bone regeneration. Besides, piezoelectric materials can be used in the surgical units for dental implants/imaging and dental hygiene. Under applied force, piezoelectric materials can generate surface charge which can inhibit bacterial growth via the production of reactive oxidative species (ROS). These advantages together imply a tremendous benefit of using piezoelectric materials for GBR to treat periodontitis. Yet, conventional piezoelectric materials such as Polyvinylidene fluoride (PVDF), Lead zirconate titanate (PZT), BaTiO3 etc. are either non-degradable or even contain toxic elements (e.g. Lead in PZT) that require invasive removal surgeries and thus are not favorable for dental implants. In this regard, we have recently developed new biodegradable piezoelectric nanofiber mat of Poly-L-Lactide Acid (PLLA), a common safe medical material used extensively for bone scaffold and implants. This material has been also used as GBR23 (e.g. Guidor®) due to its excellent mechanical strength, biocompatibility and biodegradability although lacking two important properties of being osteogenic and antibacterial for periodontitis treatment.

A novel biodegradable piezoelectric nano-composite GBR membrane of PLLA and MgO (Magnesium Oxide) which along with remotely-controlled ultrasound (US) can fulfill all the aforementioned desired properties of an excellent GBR membrane to treat periodontitis. The biodegradable MgO-PLLA membrane under applied US can generate well-controlled surface charge which along with the osteogenic property of MgO can significantly induce bone regrowth and reduce inflammation. In addition, the surface charge will also generate controllable ROS which can then kill bacteria. Together, the piezoelectric nanocomposite of MgO-PLLA with tailorable mechanical properties/long-degradation profile and the US stimulation will create a synergistic effect to effectively treat periodontitis.

Ultrasound was employed as it is non-invasive and commonly used for dental hygiene. The addition of MgO can increase stiffness of the PLLA film, facilitating the handling of this membrane and produce a basic element to neutralize any acidic byproducts from the degradation of PLLA. Notably, MgO/Mg2+ is known to promote bone regeneration. This approach of using non-invasive remotely-controlled ultrasound to generate tailorable surface charge on the MgO-PLLA nanocomposites will not only be significant to dental treatment but also the regeneration of tissues such as nerve, muscle, bone, cartilage etc. and useful for other applications to prevent bacterial infection in medical implants/surgery. Given the use of portable ultrasound, the treatment could even be done at home, helping patients to avoid frequent/repeated visits to dental clinics, which is significant in case of an infectious disease out-break such as the COVID-19 pandemic.

The Guided Bone Regeneration (GBR) membrane is innovative because it is safe, biodegradable, highly antibacterial and osteogenic to provide an optimal treatment for periodontitis. A novel approach was employed to generate well-controlled surface charge that drives bone regeneration and kills bacteria at the same time. The surface charge will be produced and fine-tuned by combining, for the first time, the use of MgO-PLLA piezoelectric nanofibers and non-invasive ultrasound which is commonly used for dental hygiene/treatment. A novel approach was utilized to combine surface charge and Mg release, creating a synergistic effect that promotes bone regeneration. It will be the first time that charge-generated ROS can be used in a combination with physical stimulation of ultrasound (acoustic wave) to create a highly antibacterial property that can even kill antibiotic-resistant strains.

The nanocomposite allows one to easily obtain different mechanical strengths, pore-sizes and flexibility by tuning the composition and fabrication/processing-conditions to create the optimal MgO-PLLA composite suitable for dental implants. Besides, piezoelectric performance and degradation profile (based on MgO concentration and processing-conditions) can be also tailored. Together, this excellent control over various properties is an innovative and powerful characteristic of the proposed GBR membrane that has not been achieved in conventional GBR biomaterials.

The MgO-PLLA nanocomposite membrane can be made by electrospinning and all materials used (PLLA and MgO) have been shown to be biodegradable and safe for use in many U.S. Food and Drug Administration (FDA)-approved or Certification (CE)-marked medical implants. The applied US is also commonly used for dental cleaning. As such this is a very highly translational biomaterial which could obtain a quick FDA approval for clinical use. Note that although US has been used for dental hygiene, US is only employed for mechanical stimulation as a tool to generate surface charge on the PLLA/MgO membrane and this surface charge is the novel driving force that induces dental-bone growth and antibacterial effect.

Thus, a combination of many novel concepts (charge-induced bone regeneration and anti-bacteria), and new approaches (combining surface charge, ultrasound and Mg ion release to enhance/induce dental bone growth) along with the use of a piezoelectric nanocomposite with highly-tunable mechanical/degradation properties to create a powerful, highly-controllable GBR membrane for treating periodontitis make this disclosure highly innovative.

Figure 2:
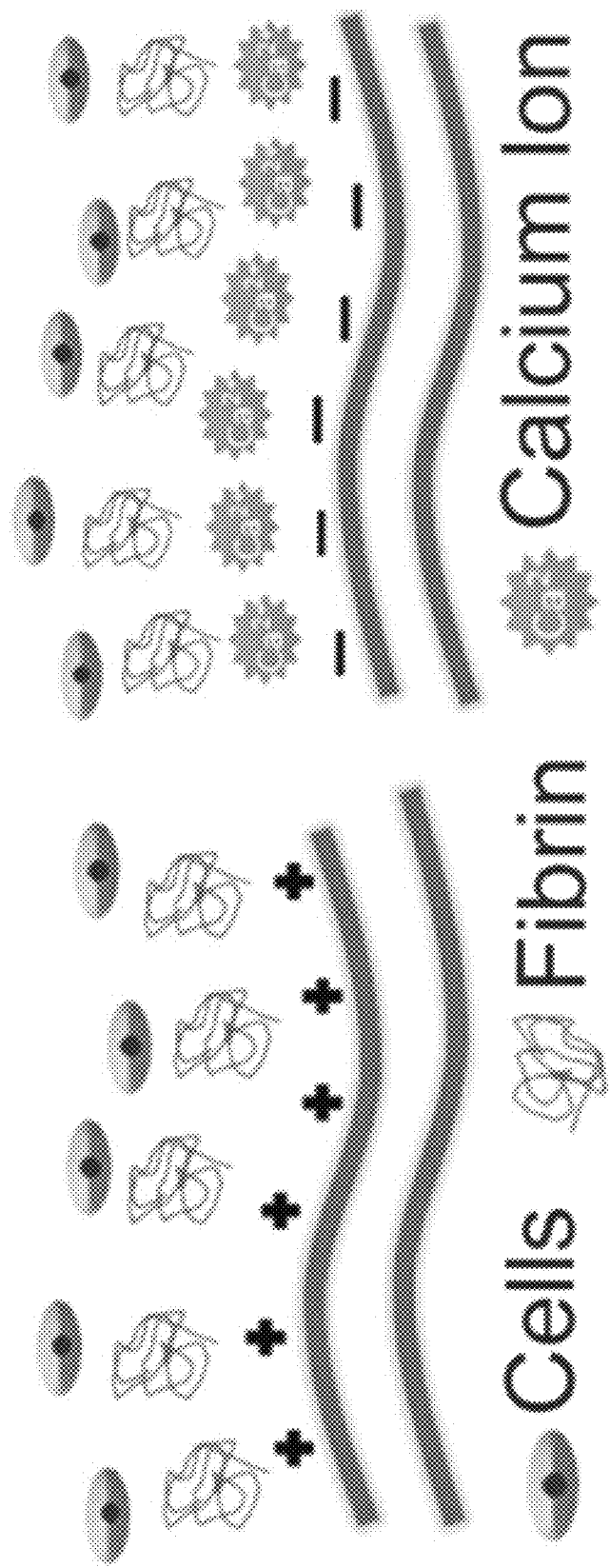
FIG. 2 is a schematic diagram illustrating mechanisms of fibrin-mediated osteoconduction on positively (+) and negatively (−) charged surfaces.

MgO-PLLA is good for bone generation because the piezoelectric MgO-PLLA receives ultrasound (acoustic pressure) to generate well-controlled surface charge which is beneficial to bone regeneration. Evidence shows bone favorably grows on charged surface of polarized materials. An exact mechanism of the signal transduction inside cells still remains elusive. Yet, a commonly accepted explanation is the effect of surface charge to facilitate absorption of proteins/molecules beneficial to bone growth. Both negative and positive charges promote deposition of fibrin and other molecules such as fibronectin, osteocalcin, and BMP (FIG. 2). This layer of fibrin and the other key proteins/growth-factors can serve as an extracellular matrix (ECM), facilitating cell deposition and proliferation for bone growth at the interface with charged surface. In addition, Mg2+ released from MgO biodegradation is known to facilitate bone regeneration. We also can tune the MgO concentration to produce sufficient basic environment which neutralizes acidic byproducts of the PLLA degradation, thus reducing any acid-induced tissue inflammation. Our preliminary data below (Example 2 and 3) have also shown the ability of this piezoelectric material to enhance osteogenesis of stem cells in vitro and induce bone growth from a calvarial defect model in vivo.

It has been shown that non-degradable piezoelectric materials can receive ultrasound (US) to produce surface charge which can react with water to produce reactive oxidative species (ROS) to effectively kill bacteria. Interestingly, the ability of ROS in combination with physical stimulations may even kill antibiotic-resistant strains. Super bugs have anti-oxidant enzymes on their membrane to neutralize the ROS. Yet, under physical stimulation such as light (photon), the membrane is transiently ruptured and allows intracellular penetration of ROS to bypass this defense mechanism of the bacteria. We can control and engineer the US in our proposed approach to rupture the cell membrane via the sonoporation effect. In our preliminary data (Example 2), we have also demonstrated the ability of piezoelectric surface charge to effectively kill bacteria in vitro.

Thus, along with excellent and tunable mechanical properties of the MgO-PLLA nanofiber mesh (e.g. being strong, flexible, slow degrading and biocompatible), the ability to generate useful surface charge for bone regeneration and anti-bacterial effect makes the piezoelectric biodegradable MgO-PLLA nanofibers a unique and powerful biomaterial platform to treat periodontitis.

Example 1

Assessing Surface Charge, Mechanical Properties and Degradation Profile of the Composite Piezoelectric MgO-PLLA Barrier Membrane with Applied US The mechanical/degradation properties of the MgO-PLLA nanofiber composite were tailored by tuning composition/fabrication-condition, and a library of surface charge generated by the piezoelectric MgO-PLLA barrier membrane with different applied US was constructed.

Piezoelectric output (electrical charge) is proportional to applied force and piezoelectric performance. The piezoelectric PLLA nanofibers can produce different charges, proportional to applied force and processing condition of the nanofiber films. It was shown that the nanofiber film of MgO-PLLA was able to provide useful piezoelectric performance. The applied US and material-processing condition were tuned to control the generated surface charge. Furthermore, PLLA is known to have a long degradation profile, thus it should provide a stable, consistent output-charge under the applied US even when embedded inside a culture medium or implanted inside the body. The preliminary data in this aim demonstrated such a stability of the surface charge, generated by the PLLA membrane over a course of at least 26 days, sufficient for the time period of stimulation in the in vitro and in vivo studies.

In order to fabricate piezoelectric MgO-PLLA nanofibers, electrospinning techniques were used. PLLA was dissolved in Dichloromethane (DCM) and MgO nanoparticles (NPs) were suspended in Dimethylformamide (DMF) by means of sonication. After that, the two were mixed well and another 1 h sonication was allowed for well-distribution of MgO NPs in the mixture. A high voltage (~14 kV) was applied between the injection metal needle and the collector drum, and the speed of the drum was adjusted (0~4000 rpm) to mechanically stretch and align the nanofibers. An additional post-annealing at sequential temperatures of 110° C. and 160° C. was applied to obtain a high crystallinity and stabilize the nanocomposites. A series of MgO-PLLA with different MgO contents (0.5%, 1%, 5%, 10%. wt. %) were fabricated. To evaluate the microstructure of the nanocomposites, scanning electron microscope (SEM) coupled with energy dispersive X-ray (EDX) was employed to verify the existence of PLLA and Mg in the composites. Besides, 1D X-ray diffraction (XRD) and 2D XRD were adopted to determine the phase composition. To evaluate the crystallinity, differential scanning calorimetry (DSC) was utilized.

Figure 3:
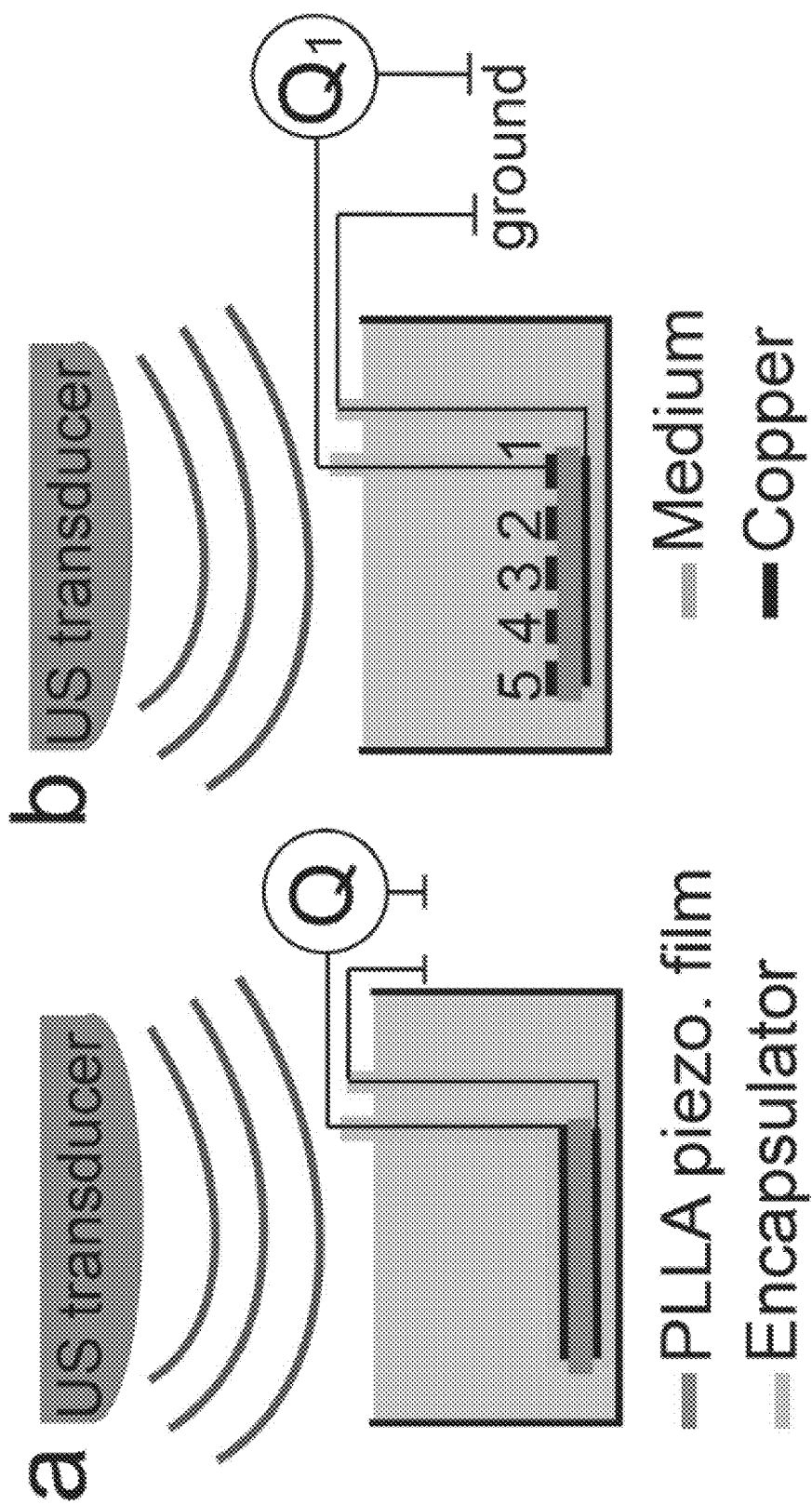
FIG. 3 illustrates an assessment of generated surface charge. (a) Using an electrometer to quantify charge (Q) on entire film surface. (b) Quantifying surface-charge at different locations to identify if the charge is uniform across the film surface. The numbers (1, 2, . . . 5) denote arrays of electrodes.

The surface charge under applied US was evaluated. To characterize the output surface charge, electrodes of copper were deposited on both sides of the films and the electrodes were encapsulated with polyimide. Then, ultrasound (US) force was applied on the film, placed in culture medium, and output surface charge was collected using an electrometer (FIG. 3 at (a)). Ultrasound (US) was performed daily for 20 min/day with an intensity varying from 10-400 mW/cm2 at 40 KHz. The same low-frequency kilohertz ultrasound (20-42 kHz) of clinical dental scalers is used for surface cleaning by disrupting calculus, debris, and bacteria on the external or internal surfaces of the tooth. The US intensity was varied to obtain different output charges. Alternatively, the piezoelectric constants of the PLLA film can be changed. A library of useful output charges upon different applied US and piezoelectricity of the MgO-PLLA nanocomposite was constructed. To identify if the surface charge was homogeneously or heterogeneously distributed, the arrays of electrodes were fabricated on the top surface of the PLLA film while on the bottom, a common ground electrode was used (FIG. 3). From each pixel (each electrode), the output charge from the film under applied US was measured with the US transducer spatially fixed at the middle of the film. Comparing output charges from different electrodes (vs. ground), it was determined if the surface charge was homogeneous or heterogeneous (i.e., homogeneous if all electrodes give out the same charge).

The mechanical and adhesion properties of the MgO-PLLA membrane for periodontitis treatment were evaluated. To test the mechanical properties of the nanocomposite, a universal mechanical testing machine (Instron 5542) was utilized by doing a uniaxial tensile strength test. Rectangular-shaped samples of 20 mm×5 mm were tested with a crosshead speed at 10 mm min-1. To test adhesion property, a contact angle test was done on a 10×10 mm sample surface. The contact angles of droplets of distilled deionized (DI) water on the surface of the polymer films were measured using a digital contact angle measurement system equipped with a CCD camera (CAM 100 series, KSV Instruments). Temporal images of the water droplet on different polymer films were recorded, as well as the contact angle values. In parallel to the MgO-PLLA nanofiber films, the same tests on a commercial GBR membrane (Guidor™) used as a benchmark for comparison were conducted.

The degradation profile and functional lifetime of the MgO-PLLA nanofiber film was assessed. The degradation profile of the film was studied. Different piezoelectric MgO-PLLA composites with different concentrations of MgO nanoparticles inside the PLLA solution and the films made of different spin-speeds/annealing-conditions of the electrospinning process, were conditioned at 37° C. in different buffer solutions and simulated body fluids. These buffers included phosphate buffered saline (PBS), simulated body fluid (i.e., Hank's solution, artificial saliva) and cell culture medium. Every day, the materials were taken out from the solution, dried and measured the remaining weight. Furthermore, DSC was employed to study thermal properties and quantify the molecular weights for each material over the course of their degradation. In addition, the functional lifetime (the period over which the MgO-PLLA still provides a consistent output charge) was assessed by using copper taped to fabricate electrodes on two sides of the collected films at different time points and studied output signals from the films under applied US. The outputs were compared before and after solution submergence under the same applied US to validate the stability of output signals over a course of 2 months. A library of lifetimes with different membrane materials was constructed.

Results

The desired piezoelectric nanocomposite was obtained. A typical membrane (MgO-PLLA with 5 wt. % MgO) is ~30 µm thick (FIG. 4 at (a) and (b)). ICP-OES results confirmed the concentration of MgO to be 5.0±0.6%, which was identical to that of MgO added to the solution for electrospinning. FIG. 4 at (c) and (d) show the SEM and coupled EDS data of 5% MgO-PLLA after electrospinning followed by heat treatment. Based on the EDS results, it can be concluded that the MgO is uniformly distributed in the PLLA nanofibers. This was further confirmed by XRD (FIG. 5 at (a)), with the peak of MgO (MgO (200)) identified on the spectrum. The crystallinity of the MgO was calculated based on the DSC curve (FIG. 5 at (b)). By using an estimated enthalpy of fusion for Pure PLLA (93.6 J/g), the calculated crystallinity for MgO-PLLA is around 91%, which is higher compared with the piezoelectric PLLA fabricated (without MgO) and treated under the same condition (~88%).

Evaluating piezoelectricity of the MgO-PLLA membrane: The open circuit output voltage responding to 1 MHz ultrasonic waves (FIG. 6) was measured. The transducer made by the new MgO-PLLA film and the reported piezo-PLLA film showed a similar output voltage, indicating that the addition of 5 wt. % MgO NPs didn't compromise piezoelectricity of the piezoelectric PLLA. This set the foundation for our hypothesis to combine both effects of piezoelectricity and Mg release.

Stability of output charge: It was shown that piezoelectric PLLA nanofiber films, made with different collector spin speeds, can provide different levels of piezoelectricity. Notably, the piezoelectric film when conditioned inside PBS at 37° C. can provide a sustained and stable charge over a period of 1 month under application of external US as seen in FIG. 7. The long period to sustain the piezoelectric charge is important to the lengthy cell-culturing and implantation of the piezoelectric GBR membrane.

A library of different surface charge in a wide range of (10 pC-100 nC) from the use of different piezoelectric MgO-PLLA membranes and applied US was obtained. This surface charge is desired as it is measurable and wide enough to facilitate the study of charge effect on bone regeneration. It also includes the reference value (~116 pC), used in the preliminary study to induce bone growth from the piezoelectric PLLA scaffold and generate ROS to kill bacteria. The membranes with certain MgO composition were obtained to exhibit a similar or superior mechanical/hydrophilic property to the commercial GBR membrane. If a higher strength is needed, the electrospinning, annealing times or MgO component can be increased to obtain a membrane with higher stiffness.

Example 2

Assessing In Vitro pH Neutralization, Osteogenesis, and Antibacterial Effect of the Piezoelectric MgO-PLLA Barrier Membrane The MgO-PLLA barrier membrane with applied US can release Mg ions and generate surface charge which together creates a synergistic effect to reduce inflammation and significantly induce/enhance osteogenesis and antibacterial effects in vitro.

The surface charges can absorb beneficial proteins which lay down an extracellular matrix layer to facilitate cell deposition, and tissue remodeling while triggering several molecular transduction mechanisms, such as calcium signaling, TGF-β/BMP, MAPK/ERK, Wnt/β-catenin pathways, etc., to induce osteogenesis and bone formation. Over the course of degradation, the MgO-PLLA nanocomposite also release Mg+ ion which has been also shown to promote bone growth via substantial increases of neuronal calcitonin gene-related polypeptide-α (CGRP). Mg ions also generate a basic environment, which can neutralize the acidic byproducts of PLLA to avoid any risk of acid-induced inflammation. In addition, surface charge can also generate reactive oxidative species (ROS) for antibacterial effect. The ROS in combination with physical stimulations could kill antibiotic-resistant strains by rupturing the bacterial membrane which is known to contain anti-oxidant enzymes and protect the bacteria from ROS. Physical stimulation such as light (photon) has been shown to rupture such a membrane transiently and allow intracellular penetration of ROS to bypass this defense mechanism of the bacteria. The US can be controlled and engineered to achieve the same antibacterial property as a sonoporation effect.

Mg ion release and pH of the MgO-PLLA nanofiber membrane during degradation were assessed. The Mg2+ release profile was studied by immersing a 1 mm×1 mm square MgO-PLLA nanofiber membrane in 1 mL Hanks' Balanced Salt Solution (HBSS, Calcium and Magnesium-free, Sigma) in 24 well plate at 37° C., with the soaking solution gathered and replaced every day. Inductively coupled plasma (ICP) was used to determine the Mg2+ release every day to see if it was enough for osteogenesis. To test the potential for pH neutralization, the pH profile of the soaking solution was monitored every day. Degradation products of synthetic polymers reduce local pH, potentially inducing inflammatory reaction. The addition of MgO NPs should be able to neutralize the pH value due to their dissolution. Therefore, the pH value of the soaking solution was monitored daily to compare the pH value of piezoelectric MgO-PLLA nanocomposites with pure PLLA film counterparts and the commercial PLLA-based GBR membrane (Guidor).

In vitro osteogenic effects of MgO-PLLA membrane were investigated. The experimental design for the in vitro osteogenic effects of MgO-PLLA membrane is shown in Table 1. Human Periodontal Ligament Stem Cells (hPDLSCs) were used to test the osteogenic effect of the membrane. hPDLSCs have shown to share the stem-cell characteristics of the other postnatal human mesenchymal stem cells, and it is considered a useful therapeutic means of repairing periodontal defects and are a possible resource for dental regeneration. hPDLSCs were seeded on sterilized membrane (1×1 cm2) in 24-well plate at density of 5×104/mL. After attachment, both growth medium and osteogenic medium were employed for cell culture, with 20 min sonication every day to generate surface charge on the membrane. At days 7, 14, and 21, real-time polymerase chain reaction (PCR) was used. In brief, RNA was harvested by Trizol, then washed and transcribed to cDNA. Primers including osteocalcin (OCN), Osterix, Bone morphogenetic protein (BMP) and Collagen type I were used to test the gene expression during osteogenesis.

TABLE 1

Designed groups for in vitro osteogenic effects study

| Group | Condition (cultured in normal growth medium) | Note | Group | Condition (cultured in osteogenic medium-ODM) | Note |
|---|---|---|---|---|---|
| 1 | Nonpiezo PLLA (300 rpm22) | Sham | 13 | Nonpiezo PLLA | Sham |
| 2 | Nonpiezo PLLA + 0.5% MgO | Sham | 14 | Nonpiezo PLLA + 0.5% MgO | Sham |
| 3 | Nonpiezo PLLA + 1% MgO | Sham | 15 | Nonpiezo PLLA + 1% MgO | Sham |
| 4 | Nonpiezo PLLA + 5% MgO | Sham | 16 | Nonpiezo PLLA + 5% MgO | Sham |
| 5 | Nonpiezo PLLA + 10% MgO | Sham | 17 | Nonpiezo PLLA + 10% MgO | Sham |
| 6 | Piezo PLLA | Sham | 18 | Piezo PLLA | Sham |
| 7 | Piezo PLLA + 0.5% MgO | Exp. Group | 19 | Piezo PLLA + 0.5% MgO | Exp. Group |
| 8 | Piezo PLLA + 1% MgO | Exp. Group | 20 | Piezo PLLA + 1% MgO | Exp. Group |
| 9 | Piezo PLLA + 5% MgO | Exp. Group | 21 | Piezo PLLA + 5% MgO | Exp. Group |
| 10 | Piezo PLLA + 10% MgO | Exp. Group | 22 | Piezo PLLA + 10% MgO | Exp. Group |
| 11 | Glass | Positive | 23 | Glass | Positive |
| 12 | Guidor | Commercial | 24 | Guidor | Commercial |

Furthermore, three staining methods were employed. First, at day 7 and 14, alkaline phosphate (ALP) was adopted to evaluate the early osteogenic effect of the membrane. Cells were fixed in 4% Paraformaldehyde (PFA) and stained with BCIP/NBT ALP Color Development Kit for qualitative imaging. Secondly, at day 14 and 21, Alizarin Red S (ARS, Sigma, 2%, pH=4.3) was used to stain and deposit local calcium. Cells were collected, rinsed with Phosphate buffered saline (PBS) and fixed in 4% PFA for 15 min. Afterwards, Alizarin Red S was used for staining for 10 min at 4° C., and washed until no more color appeared. Third, collagen secretion was employed. At day 21, cells were collected, rinsed with PBS and fixed in 4% PFA for 15 min. Sirium Red (SR, 0.1%, Sigma) was employed overnight, and washed until no more color appeared. Optical microscope with camera was used for image acquisition. The PCR gene expression and protein staining results were compared between the groups, using student T-test for two groups or ANOVA for more than two groups. Once the performances of the experimental groups were shown, the applied US was varied, processing-parameters (spin-speeds of the collector drum etc.) to change output surface charges for identifying the best membranes for osteogenesis.

Ultrasound parameter selection was investigated. Ultrasound (US) for all sham and exp. groups were performed daily for 20 min/day with an intensity varying from 10-400 mW/cm2 at 40 KHz. The acoustic energy from low-frequency kilohertz ultrasound (20-42 kHz) emitted by an oscillating tip of clinical dental scalers was used for surface cleaning by disrupting calculus, debris, and bacteria on the external or internal surfaces of the tooth, demonstrating the safety of the US frequency range for clinical dental therapy. Therefore, the frequency is set at 40 kHz to simplify the experiment. The intensity was chosen below 500 mW/cm2 because it has been a standard threshold to avoid heating damage on tissues in vivo and human cells In vitro antibacterial effects of MgO-PLLA membrane were investigated. The experimental design for the in vitro antibacterial effects of MgO-PLLA membrane is shown in Table 2. In general, two types of bacteria, including *Porphyromonas gingivalis* (*P. gingivalis*, ATCC 33277) and methicillin resistant *Staphylococcus aureus* (MRSA, ATCC 43300) were employed. P.g. is one of the most common bacteria in oral disease. More importantly, it is considered the keystone species in the development of chronic periodontitis. MRSA has developed to a major global health concern since it can cause bloodstream infections, surgical site infections and pneumonia.

The antibacterial effects experiment was carried out as follows, *P. gingivalis* was grown anaerobically in Columbia broth (CB) supplemented with hemin and menadione for 15-18 hours. Membranes at the scale of 1 mm×1 mm with 5 replicates, were inoculated in 1.5 mL centrifuge vial with 1 mL suspension at the density of 108 CFL/mL at 37° C. The initial optical density of suspension was recorded as optical density (OD). Negative control was the same condition without membrane. The vials were applied to ultrasound (or Non-Ultrasound as comparison) to generate surface charge 20 min a day. At 1 and 5 days, aliquots of culture medium were taken, serially diluted and placed on agar plates. The viability was determined by spotting 20 μL of the serially diluted samples in CB (101 to 108). Similarly, MRSA was grown in tryptone soy broth (TSB) culture medium and cultured in aerobic conditions for 12-16 hours. The concentration of the bacterial suspension was adjusted to 1×106 CFU/mL. Membranes, at the scale of 1 mm×1 mm with 5 replicates, were inoculated in 1.5 mL centrifuge vial with 1 mL suspension at the density of 1×106 CFL/mL at 37° C. The vials were applied to ultrasound to generate surface charge 20 min a day. At 1 and 5 days, aliquots of culture medium were taken, serially diluted and placed on agar plates. The viability was determined by spotting 20 μL of the serially diluted samples in CB (101 to 108).

Once the performances of the experimental groups were shown, the applied US was varied, processing-parameters (spin-speeds of the collector drum etc.) to change output surface charges for identifying the best membranes for antibacterial effect.

The US parameters applied for in vitro antibacterial effects were the same as the in vitro osteogenic effects study.

TABLE 2

Designed groups for in vitro antibacterial effects study

| Group | Condition (US treatment) | Note | Group | Condition (non US treatment) | Note |
|---|---|---|---|---|---|
| 1 | Nonpiezo PLLA (300 rpm22) | Sham | 13 | Nonpiezo PLLA | Sham |
| 2 | Nonpiezo PLLA + 0.5% MgO | Sham | 14 | Nonpiezo PLLA + 0.5% MgO | Sham |
| 3 | Nonpiezo PLLA + 1% MgO | Sham | 15 | Nonpiezo PLLA + 1% MgO | Sham |
| 4 | Nonpiezo PLLA + 5% MgO | Sham | 16 | Nonpiezo PLLA + 5% MgO | Sham |
| 5 | Nonpiezo PLLA + 10% MgO | Sham | 17 | Nonpiezo PLLA + 10% MgO | Sham |
| 6 | Piezo PLLA | Sham | 18 | Piezo PLLA | Sham |
| 7 | Piezo PLLA + 0.5% MgO | Exp. Group | 19 | Piezo PLLA + 0.5% MgO | Exp. Group |
| 8 | Piezo PLLA + 1% MgO | Exp. Group | 20 | Piezo PLLA + 1% MgO | Exp. Group |
| 9 | Piezo PLLA + 5% MgO | Exp. Group | 21 | Piezo PLLA + 5% MgO | Exp. Group |
| 10 | Piezo PLLA + 10% MgO | Exp. Group | 22 | Piezo PLLA + 10% MgO | Exp. Group |
| 11 | Glass | Negative | 23 | Glass | Negative |
| 12 | Guidor | Commercial | 24 | Guidor | Commercial |

Results

Quantification of Mg release from the MgO-PLLA nanocomposite: FIG. 8 shows the release of Mg2+ from a 10×10 mm MgO-PLLA (5% MgO, wt. %) membrane. The estimated Mg2+ (quantified by ICP-MS) released at day 1 was around 5.5 µg/mL (~0.25 mM), then decreased and stabilized at day 10. To note, it has been demonstrated that enhanced osteogenic effects can be achieved with the Mg2+ ranging from 0.06 µg/mL to 48 µg/mL (~2 mM) in vitro and in vivo. Thus, the preliminary study here showed a suitable range of Mg2+ favorable for bone and dental regeneration.

The osteogenic effects of piezoelectric membrane in vitro were demonstrated. FIG. 9 showed the in vitro osteogenic effects of piezoelectric PLLA by using primary bone marrow stem cells (BMSCs) with reporters for bone sialoprotein (BSP-GFP-topaz, green) and dentin matrix 421 protein (DMP1-RFP-mCherry, red). FIG. 9 at (a) is a schematic of the progressive expression from BSP to DMP for the BMSCs that underwent osteogenic differentiation and changes in fluorescence throughout. As seen in FIG. 9 at (b) and (c), the piezoelectric membrane with ultrasound treatment greatly helped to turn on the reporter genes that representing osteogenic differentiation, illustrating that the piezoelectric effect after ultrasound treatment had improved osteogenic effects.

Bone mineralization from dental stem cells, induced by the MgO-PLLA nanocomposite and US: FIG. 10 demonstrates the Alkaline Phosphate (ALP) results of hPDLSCs cultured on MgO-PLLA (5% MgO, wt. %) membrane after 14 days US treatment in growth medium. The hPDLSCs cultured on piezoelectric MgO-PLLA membrane presented significantly higher ALP activity than any other groups. Besides, the PCR results also demonstrated a significantly higher expression of ALP gene from the cells cultured on piezoelectric MgO-PLLA membrane, indicating an increased osteogenic effect provided by the piezoelectric nano composites to hPDLSCs cultured in common growth medium.

Figure 11:
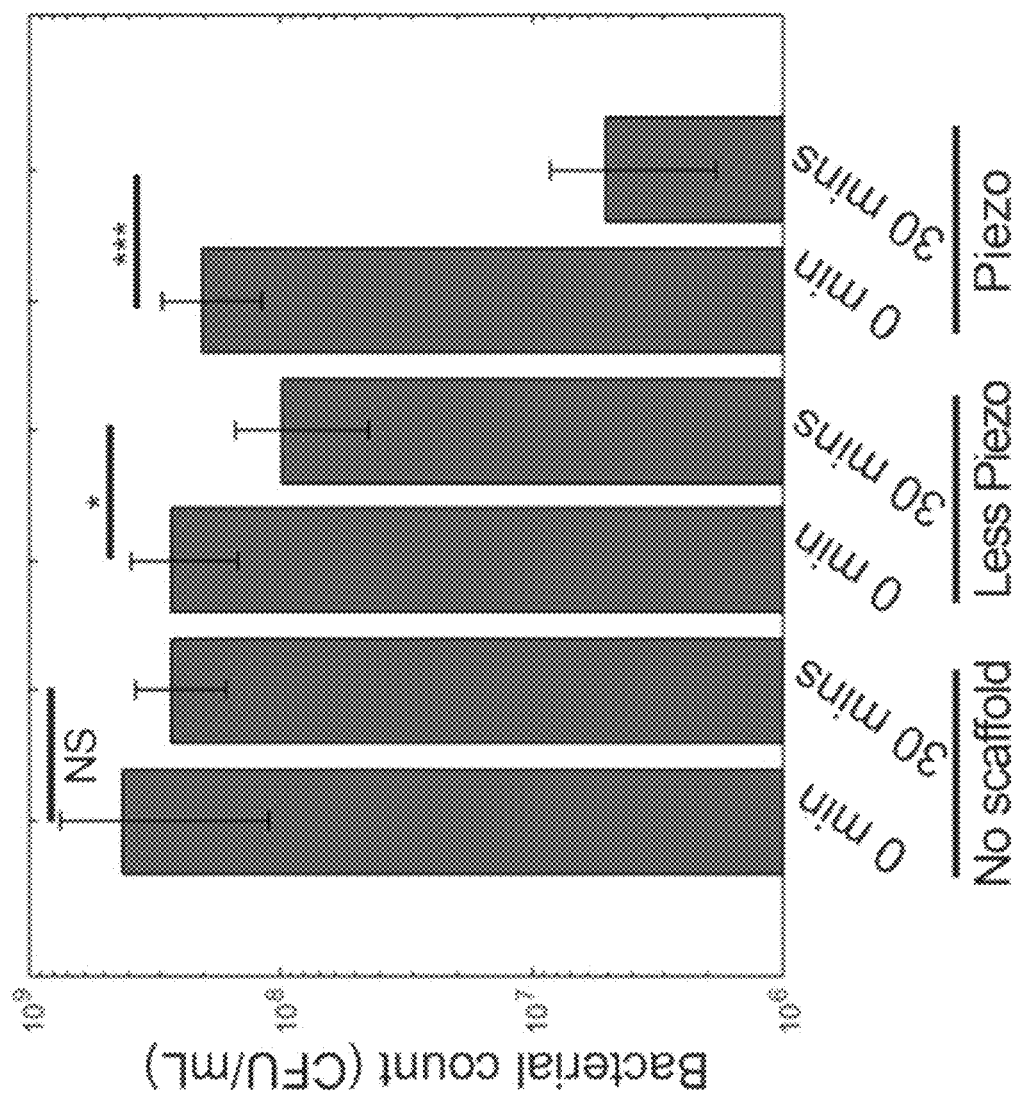
FIG. 11 graphically illustrates antibacterial effect of piezoelectric scaffold with applied US (~120 pC). NS=non-significant. * is p<0.01. *** is p<0.001 (ANOVA).

A preliminary test on the antibacterial effect of the piezoelectric membrane was conducted. A non-invasive bacteria strain of *P. putida* was used for this preliminary test. Two PLLA samples with different piezoelectric levels (1000 rpm as less piezoelectric film and 4000 rpm as a piezoelectric film) were placed into PBS vials with the bacteria. US was applied (same as above) and collected the supernatant for bacterial incubation and counting. As seen in the FIG. 11, the piezo-scaffolds after 30 minutes of sonication significantly killed more bacteria than the less-piezoelectric scaffolds. Also, the control sample (only receiving US without the piezo-scaffolds) had no significant difference of bacterial counts between before and after sonication, clear evidence to exclude the influence of US by itself and demonstrate the role of surface charge (only produced by combining US with piezoelectric scaffolds) on microbicidal effect.

The piezoelectric MgO-PLLA membranes present a more neutralized pH value, enhanced osteogenic and antibacterial effects. It was shown that the piezoelectric MgO-PLLA membrane had increased antibacterial and osteogenic effects to the other control/sham groups in Tables 1 and 2. Lead candidates of MgO-PLLA membranes (with certain MgO concentrations and processing parameters) that give the best outcomes for antibacterial and osteogenic results in vitro. About 5 lead combinations of piezoelectric nanocomposite films and stimulation conditions will be then used for the next study in vivo.

As there are many parameters (i.e. piezoelectricity, MgO content, US treatment, etc.) to consider, it is important to strategically arrange the experiments to make sure of their efficiency and effectiveness. To do this, the US treatment parameters are fixed which appear to be effective for in vivo calvarial defect regeneration, and focused on tuning the concentration of MgO as well as the drum speed of electrospinning which affect the piezoelectricity of the nanocomposites. If the nanocomposite under certain US treatment are not good enough to kill bacteria, the US treatment time will be extended and the antibacterial effectiveness vs. US treatment time will be evaluated.

Example 3

Assess Osteogenic and Antibacterial Effects of the Piezoelectric MgO-PLLA Membrane with Applied US for the Treatment of Periodontitis In Vivo The piezoelectric MgO-PLLA barrier membrane with applied US was able to prevent bacterial infection and facilitate bone-regenerate from a periodontitis rat model in vivo.

The surface charges can absorb beneficial proteins which lay down an extracellular matrix layer to facilitate cell deposition, and tissue remodeling while triggering several molecular transduction mechanisms such as calcium signaling, TGF-β/BMP, MAPK/ERK, Wnt/β-catenin pathways, etc. to induce osteogenesis and bone formation. Over the course of degradation, the MgO-PLLA nanocomposite can also release Mg+ ions which can promote bone growth via, e.g., substantial increases of neuronal calcitonin gene-related polypeptide-α (CGRP). Mg ions also generate a basic environment which can neutralize the acidic byproducts of PLLA to avoid any risk of acid-induced inflammation. Finally, surface charge can also generate reactive oxidative species (ROS) for antibacterial effect in vivo. The ROS in combination with a physical stimulation (e.g. light and US) to rupture the bacterial membrane may kill antibiotic-resistance strains.

The guided bone regeneration (GBR) property of the nanocomposite membrane was assessed. The lead membranes (noted as piezoelectric MgO-PLLA) and stimulation conditions were selected for the in vivo experiment. The in vivo experiment design is shown in Table 3. After showing the effect of experimental group #1, the membrane composition/property and stimulation was varied to identify the best condition which can promote bone growth (i.e., identifying the lead parameters) in vivo. A total of ~88 Sprague-Dawley (SD) rats (both female and male 50/50) were used. Forty-eight animals were used for the eight below groups and other 5×6=30 animals for 5 lead membrane+condition and 10 animals for pilot study.

TABLE 3

Design of in vivo experiment to assess
GBR property of the MgO-PLLA membrane

| Group | Condition | Implantation Time (weeks) | Animal number | Note |
|---|---|---|---|---|
| 1 | Piezoelectric MgO-PLLA + US | 6 | 6 | Exp. Group |
| 2 | Piezoelectric MgO-PLLA − US | 6 | 6 | Sham |
| 3 | Piezoelectric PLLA + US | 6 | 6 | Sham |
| 4 | Piezoelectric PLLA − US | 6 | 6 | Sham |

TABLE 3-continued

Design of in vivo experiment to assess
GBR property of the MgO-PLLA membrane

| Group | Condition | Implantation Time (weeks) | Animal number | Note |
|---|---|---|---|---|
| 5 | Nonpiezo MgO-PLLA + US | 6 | 6 | Sham |
| 6 | Nonpiezo MgO-PLLA − US | 6 | 6 | Sham |
| 7 | Commercial membrane Guidor | 6 | 6 | Commercial control |
| 8 | Blank | 6 | 6 | Negative control |

To test the in vivo osteogenic effects, a rat periodontal defect model was employed to evaluate the regeneration effects of the membranes. Rats are often used as an experimental periodontal model because periodontal anatomy in the molar region shares similarities with that of humans. At day 0, mucoperiosteal flaps of 5-week-old rats were elevated to uncover the alveolar bone adjacent to the lingual aspect of the first maxillary molars, with the alveolar bone removed by using a dental bur under saline irrigation. A periodontal defect of 1.5 mm×3 mm×2 mm was created. The membrane implantation or no membrane implantation (Table 3) was performed.

Animals were sacrificed 6 weeks post-surgery. The amount of regenerated bone was determined by micro-CT. Thin sections of the dental and periodontal tissues were harvested according to the following procedure: fixing, decalcification, dehydration, transparentizing, embedding and finally slicing. Then, the tissue sections were stained with Hematoxylin and Eosin staining (H&E) and Masson stain. The vertical bone loss around the defect was determined by measuring the distance between cement-enamel junction (CEJ) and alveolar bone crest at three different points (mesiolingual (ML), mild lingual (L) and distolingual (DL)) on the lingual of the first maxillary molars. Results were compared between the groups using T-test (for two groups) and ANOVA (>two groups).

The antibacterial property in vivo, using a rat periodontitis disease model was assessed. To assess antibacterial effect, an adapted rat periodontitis disease model was used. Group assignment were similar to Table 3. Briefly, 3-week-old SD rats were given sulfamethoxazole (1 mg mL-1) and trimethoprim (200 µg mL-1) in their drinking water for 4 days to reduce any original oral microorganisms, followed by a 3-day antibiotic-free period before being challenged by bacteria, *P. gingivalis*. This bacteria is one of the most common strains in oral disease and considered the keystone species in the development of chronic periodontitis. The rats were orally challenged with 0.5 mL (1×108 cells per mL) of the bacterial suspension in carboxymethyl cellulose (CMC) at 8, 10 and 12 days. At day 16, the membrane was placed at the second molar. Animals were sacrificed 4 weeks after implantation. Micro Computed Tomography (Micro CT) was used to observe the changes in morphology, quantity, and quality of the alveolar bone over the course of time. Parameters including bone mineral density (BMD), bone volume (BV), tissue volume (TV), and BV/TV around the molars were measured by micro-CT. The bone height around the maxillary molars were analyzed. To assess bacterial infections in each animal groups, strain-specific PCR were used for gingival tissues. Again, the results were statistically compared between experimental groups (using T-test or ANOVA). A total of ~88 rats were used for this study.

Ultrasound selection for antibacterial effects were studied. The US applied was similar to the in vitro experiment. The rationale for these US parameters has been provided in the above section. Yet, only the lead combinations of the MgO-PLLA membrane and stimulation conditions were used in this experiment to reduce the number of animals. The US treatment (20 min/day, 5 days per week) was started right after the implantation surgery.

Results

Figure 12:
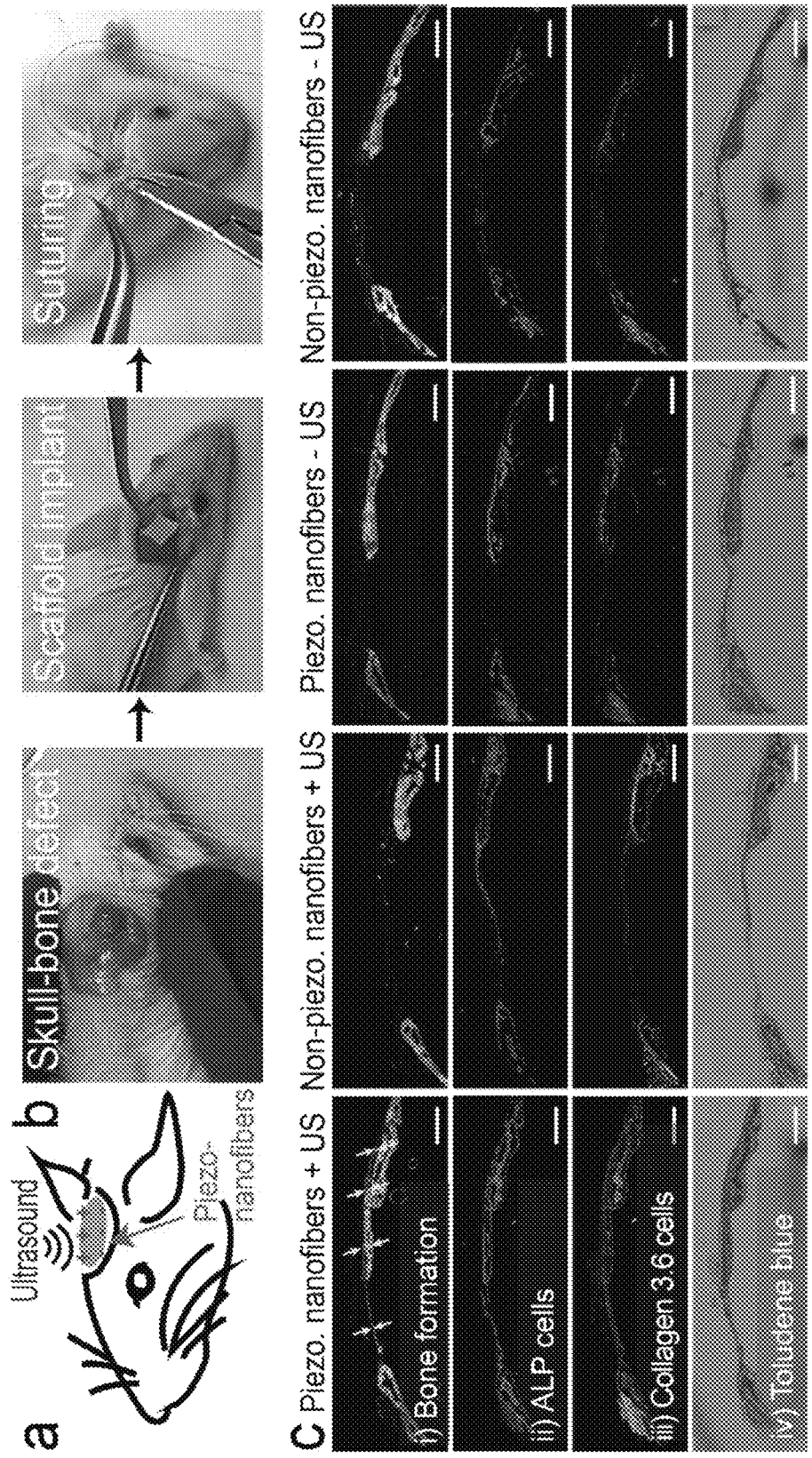
FIG. 12 illustrates preliminary data on the use of piezoelectric PLLA membrane (3000 rpm) and non-piezo PLLA scaffold (300 rpm as a control) to induce bone formation under the same application of US in vivo. (a) is a simplified schematic of the in vivo experiment. (b) shows the sequence of the different steps involved in the surgery. A critical sized calvarial defect in mice was created and the nanofiber film was implanted into it to observe bone formation on the film. This is followed by treating the animals with US at the site of implantation to mimic the in-vitro system. The experiment was performed at n=5 animals per group. (c) i. Aperture contrast images comparing the mineral formation in the defect between the four animal groups. Yellow arrows indicate the new bone formation, clearly seen in the first group while it cannot be seen in the other groups. (c) ii. Fluorescent images comparing the presence of ALP producing cells in the defect between the four groups using vector blue ALP staining. (c) iii. Microscopic fluorescent images comparing the migration of Collagen 3.6 gene positive cells in the defect between the four groups. (c) iv. Microscopic images comparing the bone formation in the defect between the four groups using Toludene blue staining. All scale bars are 1 mm.

A preliminary in vivo study was performed, using a calvarial (skull) bone defect model of transgenic mice to demonstrate the osteogenic effect of our piezoelectric nanofiber membrane with applied US. A critical size defect of 3.5 mm diameter was created on the calvaria bone and implanted the PLLA piezoelectric nanofiber meshes into the bone defects of four different animal groups (n=5/group). The first group (group #1) received the piezoelectric nanofibers with applied US (experimental group). The second group (group #2) received the non-piezoelectric nanofibers with applied US (sham). The third group (group #3) received the piezoelectric PLLA nanofibers without applied US (sham) and the fourth group (group #4) received the non-piezoelectric PLLA nanofibers without applied US (negative control). The material was placed on the bone so that it covered the defect and the skin was sutured shut on top of the material (FIG. 12 at (a) and (b)). The US (40 KHz, 30 minutes/day for 20 days with a break of 2 days after every 5 days) was applied at the site of implantation for mice in groups 1 and 2. The animals were sacrificed 6 weeks after surgery to collect the calvaria bone for assessment. An histological staining was performed on sections of the collected samples to assess bone growth. The cell distribution and tissue morphology were assessed to analyze the formation of bone and migration of cells into the defect for each mouse. FIG. 12 at (c) describes representative histological images of bone tissue slices which were achieved from the four experimental groups. As seen in FIG. 12 at (c) (i), the mice that received piezoelectric PLLA nanofiber films and US (group 1) had much more new-bone formation (between yellow arrows) than the ones from other groups which either received no ultrasound or non-piezoelectric nanofibers (i.e., groups 2-4). The results (FIG. 12 at (c) (ii)) show a greater amount of ALP positive cells in the defect area of mice in group 1 (with piezoelectric films and US) than mice in the other groups. The transgenic mice with Collagen 3.6-GFP-topaz fluorescent reporter genes were used. The Collagen 3.6 gene is commonly expressed (with green color) in mature osteoblasts (derived from the host stem cells), and increased expression of this particular gene indicates increased osteoblast activity in a region. Therefore, the green Collagen 3.6 fluorescent signals allow visualization of the number of osteoblast-like cells at the defect site. FIG. 12 at (c) (iii) clearly shows mice that received the piezoelectric films and US (group 1) have a higher amount of green fluorescence in the defect than the other ones from groups 2-4 which receive either no US or non-piezoelectric nanofibers. This illustrates the effect of surface charge inducing bone cell migration onto the piezoelectric films. Lastly, toluidine blue staining was used to visualize the formation of bone in the defect. As seen in FIG. 12 at (c) (iv), the animals that received the piezoelectric scaffolds (group 1) have much greater amounts of bone formation than the animals of other control/sham groups (i.e. groups 2-4). In brief, the in vivo indicates that the group 1 with the piezoelectric scaffold and ultrasound (US) strongly induce mineral/bone formation, ALP release and osteoblast migration. Note that we only used the piezoelectric effect of PLLA here to induce bone formation. The combination of this surface charge and MgO nanoparticles which are highly osteogenic would significantly enhance the regenerative capability to promote dental-bone growth in vivo.

The animals receiving the piezoelectric MgO-PLLA membranes with ultrasound (i.e., group 1) were estimated to exhibit enhanced antibacterial effect and dental/bone regeneration, compared to the other sham/control groups in Table 3. The MgO-PLLA membranes were identified with advantageous stimulations that provide the best outcomes for the treatment of periodontitis. It has been shown that the piezoelectric nanofiber films can produce a stable output charge for at least 4 weeks (FIG. 7) which is suitable to the stimulation time here. For future clinical trials, if a longer time of stimulation is needed, the molecular weight/crystallinity of the PLLA film can be enhanced or the film with a biodegradable layer can be encapsulated and can still allow the transferring of charge to the outside environment for the desired stimulation. Besides the effect of surface charge and Mg ion release, the membrane could be combined with a small amount of growth factors below the toxicity level to promote the bone regeneration.

All comparisons were performed by student paired t-test (for two groups) and ANOVA (for more than two groups) with a significant level of p=0.05. To select the sample number for in vitro and in vivo experiments, a power analysis and the software GPower was used for difference between means of two independent groups (two-tails). A typical significant level α=0.05, a common power of 0.8, and an effect size of 1.7 were input. A number of 6 animals or samples per group were obtained. Both female and male (50/50) were used for each group. Any difference in the outcomes from these two groups were notified.

Thus, the disclosure provides, among other things, a biodegradable and biocompatible barrier membrane of piezoelectric nano composites of Metallic Oxide (MO) (e.g., Magnesium oxide, Zinc oxide and iron oxide)-PLLA (Poly-L-lactide), which can be subjected to acoustic pressure from ultrasound, to generate useful electrical charge for enhanced bone regeneration and enhanced antibacterial effects for guided bone regeneration to treat dental diseases. Various features and advantages of the disclosure are set forth in the following claims.

What is claimed is:

1. A composite material comprising:
an electrospun biodegradable piezoelectric material having a piezoelectric constant greater than 14 pC/N; and a plurality of metal oxide particles mixed with the electrospun biodegradable piezoelectric material, wherein an application of ultrasound to the composite material generates an electrical charge on the piezoelectric material and releases ions from the metal oxide particles to generate bone and provide antibacterial effects for treatment of disease in a subject, and wherein the electrospun biodegradable piezoelectric material comprises a polymer having an average intrinsic viscosity of about 2 dl/g to about 6 dl/g.

2. The composite material of claim 1, wherein the electrospun biodegradable piezoelectric material comprises a plurality of electrospun biodegradable piezoelectric fibers.

3. The composite material of claim 2, wherein the plurality of electrospun biodegradable piezoelectric fibers are aligned.

4. The composite material of claim 1, wherein the electrospun biodegradable piezoelectric material comprises poly (L-lactic acid) (PLLA), poly(D,L-lactide-co-glycolide) (PLGA), polycaprolactone (PCL), polyglycolic acid (PGA), silk, polyglycine, or a combination thereof.

5. The composite material of claim 1, wherein the plurality of metal oxide particles have an average diameter of about 0.1 nm to about 50 nm.

6. The composite material of claim 1, wherein the plurality of metal oxide particles are uniformly distributed in the electrospun biodegradable piezoelectric material.

7. The composite material of claim 1, comprising the plurality of metal oxide particles at about 0.1% to about 30% by weight of the composite material.

8. The composite material of claim 1, wherein each individual metal oxide particle comprises MgO, ZnO, FeO, or a combination thereof.

9. The composite material of claim 1, wherein the composite material has a crystallinity of greater than 90%.

10. A method of treating a dental disease in a subject in need thereof, the method comprising:
applying the composite material of claim 1 to a dental tissue of the subject, the composite material comprising a biodegradable piezoelectric material and a plurality of metal oxide particles; applying ultrasound energy to the composite material; and generating an electrical charge on at least a portion of a surface of the composite material.

11. The method of claim 10, wherein the ultrasound energy includes an intensity that is less than 0.5 W/cm$^2$.

12. The method of claim 10, wherein the ultrasound energy is applied at about 10 KHz to about 60 KHz.

13. The method of claim 10, wherein a metal ion corresponding to the metal of the metal oxide is released over time from the composite material.

14. The method of claim 10, wherein the composite material further comprises a growth factor.

15. A method of making the biodegradable piezoelectric composite material of claim 1, the method comprising:
combining a piezoelectric biodegradable polymer in a first solvent and a plurality of metal oxide particles in a second solvent to provide a mixture; electrospinning the mixture onto a collector drum having a speed of about 0.1 rpm to about 6,000 rpm to provide a fiber mesh; annealing the fiber mesh between 100° C. to 115° C. for a first period of time; and annealing the fiber mesh between 150° C. to 170° C. for a second period of time.

16. The method of claim 15, wherein electrospinning is performed at a voltage of about 10 kV to about 20 kV.

17. The method of claim 15, wherein the first period of time and the second period of time are each individually about 10 hours to about 24 hours.

* * * * *